US012750199B2

(12) United States Patent
Xu et al.

(10) Patent No.: US 12,750,199 B2

(45) Date of Patent: Sep. 29, 2026

(54) SCELL DORMANCY INDICATION BY PDCCH

(71) Applicant: QUALCOMM Incorporated, San Diego, CA (US)

(72) Inventors: Huilin Xu, Temecula, CA (US); Seyed Ali Akbar Fakoorian, San Diego, CA (US); Wanshi Chen, San Diego, CA (US); Peter Pui Lok Ang, San Diego, CA (US); Tao Luo, San Diego, CA (US); Juan Montojo, San Diego, CA (US); Muhammad Sayed Khairy Abdelghaffar, San Jose, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 18/755,094

(22) Filed: Jun. 26, 2024

(65) Prior Publication Data

US 2025/0023701 A1 Jan. 16, 2025

Related U.S. Application Data

(63) Continuation of application No. 17/090,884, filed on Nov. 5, 2020, now Pat. No. 12,028,293.

(Continued)

(51) Int. Cl.

*H04L 5/00* (2006.01)

*H04L 1/1607* (2023.01)

(52) U.S. Cl.

CPC .......... *H04L 5/0098* (2013.01); *H04L 1/1607* (2013.01); *H04L 5/001* (2013.01)

(58) Field of Classification Search

CPC ..... Y02D 30/70; H04L 1/1607; H04L 1/1671; H04L 1/1829; H04L 1/1896; H04L 5/001; H04L 5/0055; H04L 5/0098

(Continued)

(56) References Cited

U.S. PATENT DOCUMENTS

| | | | |
|---|---|---|---|
| 8,855,073 | B2 | 10/2014 | Han et al. |
| 10,660,032 | B2 | 5/2020 | Sun et al. |

(Continued)

FOREIGN PATENT DOCUMENTS

| | | | |
|---|---|---|---|
| CN | 109963296 | A | 7/2019 |
| JP | 2013507067 | A | 2/2013 |

(Continued)

OTHER PUBLICATIONS

Qualcomm Incorporated: "SCell Dormancy and Fast SCell Activation," 3GPP TSG-RAN WG1 #99, R1-1912980, 3rd Generation Partnership Project, Mobile Competence Centre, 650, Route Des Lucioles, F-06921, Sophia-Antipolis Cedex, France, vol. RAN WG1. No. Reno. USA, Nov. 18, 2019-Nov. 22, 2019, Nov. 9, 2019, XP051823742, pp. 1-13, The whole document.

(Continued)

*Primary Examiner* — Robert J Lopata

(74) *Attorney, Agent, or Firm* — Harrity & Harrity, LLP

(57) ABSTRACT

Wireless communications systems and methods related to communicating a serving cell dormancy indication field and acknowledgement. In some implementations, a wireless communication device (e.g., user equipment), may detect a physical downlink control channel (PDCCH) with a secondary cell (Scell) dormancy indication field. The user equipment can change states from an initial state to another state (e.g., a dormancy-like state to a non-dormancy like state) based on detecting Scell indicator field in the PDCCH. The user equipment may also transmit a hybrid-ARQ acknowl- (Continued)

edgment (HARQ-ACK) in response to the detecting the PDCCH with the Scell dormancy indication field. Other aspects and features are also claimed and described.

20 Claims, 12 Drawing Sheets

Related U.S. Application Data

(60) Provisional application No. 62/933,099, filed on Nov. 8, 2019.

(58) Field of Classification Search
USPC .......................................................... 370/329
See application file for complete search history.

(56) References Cited

U.S. PATENT DOCUMENTS

| | | | |
|---|---|---|---|
| 12,028,293 B2 | 7/2024 | Xu et al. | |
| 2015/0189574 A1 | 7/2015 | Ng et al. | |
| 2018/0019843 A1 | 1/2018 | Papasakellariou | |
| 2018/0092085 A1* | 3/2018 | Shaheen | H04W 36/0094 |
| 2018/0302896 A1 | 10/2018 | Nayeb Nazar et al. | |
| 2019/0297605 A1 | 9/2019 | Kim et al. | |
| 2019/0342035 A1 | 11/2019 | Zhang et al. | |
| 2020/0145167 A1 | 5/2020 | Jung et al. | |
| 2020/0358587 A1 | 11/2020 | Wang et al. | |
| 2021/0075558 A1 | 3/2021 | Takeda et al. | |
| 2022/0225140 A1* | 7/2022 | Seo | H04W 48/16 |

FOREIGN PATENT DOCUMENTS

| | | |
|---|---|---|
| KR | 20120093912 A | 8/2012 |
| WO | 2017180245 | 10/2017 |

OTHER PUBLICATIONS

International Search Report and Written Opinion—PCT/US2020/059243—ISA/EPO—Apr. 15, 2021.
LG Electronics: "Discussion on L1 Based Scell Dormancy", 3GPP TSG RAN WG1 Meeting #98bis, R1-1910838, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, 8 Pages, Oct. 5, 2019, XP051808723.
Nokia, et al., "Dormancy", 3GPP Draft, R2-1912992, 3GPP TSG-RAN WG2 Meeting #107bis, Dormancy in RAN2, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019 (Oct. 4, 2019), XP051804778, 4 Pages, p. 2.
Partial International Search Report—PCT/US2020/059243—ISA/EPO—Feb. 24, 2021.
Qualcomm Incorporated: "Fast SCell Activation and SCell Dormancy", 3GPP TSG-RAN WG1 #98bis, 3GPP Draft, R1-1911139, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019, XP051808862, XP051789915, 18 Pages, pp. 1, 5, pp. 9-12, p. 1-p. 17.
Taiwan Search Report—TW109138936—TIPO—Dec. 27, 2023.
Nokia, et al., "Dormancy", 3GPP TSG-RAN WG2 Meeting #107bis, R2-1912992, vol. RAN WG2, No. Chongqing, China, Oct. 14, 2019-Oct. 18, 2019, Oct. 4, 2019, 4 Pages, XP051804778.
Qualcomm Incorporated: "Fast SCell Activation and SCell Dormancy", 3GPP TSG-RAN WG1 #98bis, R1-1911139, vol. RAN WG1, No. Chongqing, China, Oct. 14, 2019-Oct. 20, 2019, Oct. 5, 2019, pp. 1-18, XP051808862.
CATT: "Triggering of SCell Dormancy", 3GPP TSG RAN WG1 Meeting #98bis, R1-1910325, Chongqing, China, Oct. 14-20, 2019, pp. 1-5.
Ericsson: "PDCCH Enhancements for NR URLLC", R1-1900158, 3GPP TSG RAN WG1 Ad-Hoc Meeting 1901 Taipei, Taiwan, Jan. 21-25, 2019, 21 Pages.
Ericsson: "Reduced Latency Scell Management for NR CA", R1-1911015, 3GPP TSG-RAN WG1 #98bis Chongqing, China, Oct. 14-20, 2019, pp. 1-9.
Intel Corporation: "Discussion on Fast SCell Activation and Deactivation", R1-1910682, 3GPP TSG RAN WG1 Meeting #98bis Chongqing, China, Oct. 14-20, 2019, 6 Pages.
Mediatek Inc: "Multiple HARQ Procedures and Intra-UE UCI Prioritization", R1-1908409, 3GPP TSG RAN WG1 Meeting #98 Prague, Czech, Aug. 26-30, 2019, 15 Pages.
Qualcomm Incorporated: "Fast SCell Activation and SCell Dormancy", 3GPP TSG-RAN WG1 #98bis, R1-1911139, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019, 18 Pates, pp. 1, 5, 10-12.
Taiwan Search Report—TW109138936—TIPO—Jul 11, 2024.
Vivo: "Fast Scell Activation and Dormancy like Behavior," 3GPP Draft, 3GPP TSG RAN WG1 #98bis, R1-1910242, Oct. 14-20, 2019, pp. 1-11.
Huawei, et al., "Discussion on Low Latency SCell Activation and Efficient SCell Management", 3GPP TSG RAN WG1 Meeting #98bis, R1-1910039, Chongqing, China, Oct. 14-20, 2019, Oct. 5, 2019, 19 Pages.
Qualcomm Incorporated: "Open Issues on CA," R1-1718581 Open Issues on CA, 3rd Generation Partnership Project (3GPP), Mobile Competence Centre; 650, Route Des Lucioles; F-06921 Sophia-Antipolis Cedex; France, vol. RAN WG1, No. Prague, Czech Republic, Oct. 9, 2017-Oct. 13, 2017, Oct. 8, 2017, XP051341761, 10 pages.

* cited by examiner

SCELL DORMANCY INDICATION BY PDCCH

CROSS-REFERENCE TO RELATED APPLICATIONS

The present application for patent is for a Continuation of U.S. patent application Ser. No. 17/090,884 filed Nov. 5, 2020, which claims priority to and the benefit of the U.S. Provisional Patent Application No. 62/933,099, filed Nov. 8, 2019, which is hereby incorporated by reference in its entirety.

TECHNICAL FIELD

This application relates to wireless communication systems, and more particularly to indicating a serving cell dormancy in the physical downlink control channel.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

UEs in wireless communication networks may be served by one or more serving cells. To conserve power the UE may change from a dormancy-like state to a non-dormancy-like state and vice versa for each of the serving cells or for a group of serving cells. The physical downlink control channel (PDCCH) may transmit a serving cell dormancy indication that may indicate to the UE when to change states on per serving cell or per group of serving cells basis. In response to the dormancy indication, the UE may generate a hybrid-ARQ acknowledgment (HARQ-ACK) to the BS so that the states of the service cell with respect to the UE are synchronized between the UE and the BS.

Aspects are directed to a user equipment (UE) comprising: a processor configured to detect a physical downlink control channel (PDCCH) with a secondary cell (Scell) dormancy indicator, wherein the Scell dormancy indicator is configured to switch the UE between a dormancy state and a non-dormancy state, wherein in the dormancy state the UE is configured to operate at a reduced power as compared to the non-dormancy state, and a transceiver configured to transmit a hybrid-ARQ acknowledgment (HARQ-ACK) in response to the processor detecting the PDCCH.

Further aspects are directed to the UE where the PDCCH further comprises a downlink control information (DCI) that includes the Scell dormancy indicator.

Further aspects are directed to the UE where the HARQ-ACK is a one-bit ACK that indicates that the UE detected the PDCCH.

Further aspects are directed to the UE where the processor is further configured to: generate a codebook that includes at least one bit indicating that the UE detected the PDCCH with the Scell dormancy indicator, and incorporate the codebook into the HARQ-ACK.

Further aspects are directed to the UE where the codebook is a dynamic codebook or a semi-static codebook.

Further aspects are directed to the UE where the PDCCH further comprises a DCI that includes the Scell dormancy indicator and a feedback timing information, and the processor is further configured to: determine a number of slots using the feedback timing information in the DCI, and delay the transmitting of the HARQ-ACK by the number of slots relative to a slot where the PDCCH is detected.

Further aspects are directed to the UE where the DCI is a downlink scheduling (DL) DCI and the feedback timing information is a PDSCH-to-HARQ feedback timing indicator.

Further aspects are directed to the UE where the PDCCH further comprises a DL DCI that includes the Scell dormancy indicator and a physical uplink control channel (PUCCH) resource indicator, and wherein to transmit the HARQ-ACK the transceiver is further configured to transmit the HARQ-ACK in a resource indicated by the PUCCH resource indicator.

Further aspects are directed to the UE where the PDCCH further comprises a DL DCI that includes the Scell dormancy indicator and a Downlink Assignment Index (DAI) field, the processor is further configured to determine a location of a bit for the HARQ-ACK in a codebook using the DAI field, and wherein to transmit the HARQ-ACK, the transceiver is further configured to transmit the HARQ-ACK in the codebook at the determined location.

Further aspects are directed to the UE where the PDCCH further comprises a DCI that includes the Scell dormancy indicator, and the processor is further configured to determine, using a frequency domain resource assignment (FDRA) field in the DCI, that the PDCCH is associated with a Scell dormancy indicator and is not configured to schedule data.

Further aspects are directed to the UE where to determine that the PDCCH is associated with the Scell dormancy indicator and is not configured to schedule the data, the processor is further configured to determine a resource allocation type zero is enabled and all bits in the FDRA are set to zero.

Further aspects are directed to the UE where to determine that the PDCCH is associated with the Scell dormancy indicator and is not configured to schedule the data, the processor is further configured to determine that a resource allocation type zero and a resource allocation type one are configured, the resource allocation type zero is enabled, and at least one bit in bits in the FDRA is set to zero and one bit in the FDRA is set to one.

Further aspects are directed to the UE where the PDCCH is associated with the Scell dormancy indicator and is not configured to schedule the data, the processor is further configured to determine that a resource allocation type one is enabled and all bits in the FDRA are set to one.

Further aspects are directed to the UE where to determine that the PDCCH is associated with the Scell dormancy indicator and is not configured to schedule the data, the processor is further configured to determine that a resource allocation type one is enabled and at least one bit in bits in the FDRA is set to one and one bit in the FDRA is set to zero.

Further aspects are directed to the UE where the Scell dormancy indicator includes a modulation and coding scheme field in at least one DCI in the PDCCH, and wherein the processor is further configured to modify behavior of the UE using the modulation and coding scheme field.

Further aspects are directed to the UE where the Scell dormancy indicator includes at new data indicator in at least one DCI in the PDCCH, and wherein the processor is further configured to modify behavior of the UE using the new data indicator.

Further aspects are directed to the UE where the Scell dormancy indicator includes a redundancy version indicator in at least one DCI in the PDCCH, and wherein the processor is further configured to modify behavior of the UE using the redundancy version indicator.

Further aspects are directed to the UE where the Scell dormancy indicator includes a HARQ process number indicator in at least one DCI in the PDCCH, and wherein the processor is further configured to modify behavior of the UE using the HARQ process number indicator.

Further aspects are directed to the UE where the Scell dormancy indicator includes an antenna port indicator in at least one DCI in the PDCCH, and wherein the processor is further configured to modify behavior of the UE using the antenna port indicator.

Further aspects are directed to the UE where the Scell dormancy indicator includes a demodulation reference signal (DMRS) sequence initialization indicator in at least one DCI in the PDCCH, and wherein the processor is further configured to modify behavior of the UE using the DMRS sequence initialization indicator.

Further aspects are directed to the UE where the processor is further configured to: determine an application delay associated the Scell dormancy indicator and change a behavior of the UE based on the Scell dormancy indicator during a time period associated with the application delay.

Further aspects are directed to the UE where the processor is further configured to: determine that the application delay is the time period the UE switches from a dormant bandwidth part to a non-dormant bandwidth part.

Further aspects are directed to the UE where the application delay is the same if the PDCCH schedules data or the PDCCH does not schedule the data.

Further aspects are directed to the UE where the PDCCH further comprises a DCI that includes the Scell dormancy indicator and a sounding reference signal (SRS) request field, and wherein the transceiver is further configured to transmit the SRS instead of the HARQ-ACK as an acknowledgement that the PDCCH is detected by the UE.

Further aspects are directed to the UE where the PDCCH includes a transmission power command (TPC) indicator, and wherein the processor is further configured to adjust transmission power of a scheduled physical uplink control channel (PUCCH) using the TPC indicator, and wherein the transceiver is further configured to transmit the PUCCH using the adjusted transmission power.

Further aspects are directed to the UE where the PDCCH further comprises a DL DCI that includes the TPC indicator.

Further aspects are directed to the UE where the TPC indicator adjusts the transmission power of the PUCCH to a serving cell depending on the Scell dormancy indicator.

Further aspects are directed to the UE where the PDCCH further comprises a UL DCI that includes the Scell dormancy indicator and at least one DAI indicator, the processor is further configured to determine a location of a bit for the HARQ-ACK in a codebook using the at least one DAI field, and wherein to transmit the HARQ-ACK, the transceiver is further configured to transmit the HARQ-ACK in the codebook at the determined location.

Further aspects are directed to the UE where the DCI is an uplink scheduling (UP) DCI and the feedback timing information indicates delay in a second number of slots between UL grant reception in DL and UL data transmission indicated by a Time Domain Resource Assignment (TDRA) indicator.

Further aspects are directed to the UE where the PDCCH further comprises a UL DCI that includes the Scell dormancy indicator, and the transceiver is further configured to: receive a second PDCCH that includes a DL DCI with a PUCCH resource indicator, and transmit the HARQ-ACK in a resource indicated in the PUCCH resource indicator in the DL DCI and using a slot, and the processor is further configured to: determine that the slot for the HARQ-ACK associated with the PDCCH that includes the UL DCI is the slot for a second HARD-ACK associated with the second PDCCH that includes the DL DCI.

Further aspects are directed to the UE where the PDCCH further comprises a UL DCI that includes the Scell dormancy indicator, and wherein to transmit the HARQ-ACK, the transceiver is further configured to transmit the HARQ-ACK in a resource indicated in an at least one of field in the UL DCI.

Further aspects are directed to the UE where the PDCCH further comprises a DL or UL DCI that includes the Scell dormancy indicator and a Start and Length Indicator Value (SLIV) information in a Time Domain Resource Assignment (TDRA) indicator, the processor is further configured to determine a location of a bit for the HARQ-ACK in a semi-static codebook using the SLIV information, and wherein to transmit the HARQ-ACK, the transceiver is further configured to transmit the HARQ-ACK in the semi-static codebook at the determined location.

Further aspects are directed to the UE where the PDCCH further comprises a UL DCI that includes the Scell dormancy indicator and a channel state information (CSI) request field, and wherein the transceiver is further configured to transmit a CSI instead of the HARQ-ACK as an acknowledgement that the PDCCH is detected by the UE.

Aspects are directed to a method, comprising: detecting, at a user equipment (UE) a physical downlink control channel (PDCCH) with a secondary cell (Scell) dormancy indicator, wherein the Scell dormancy indicator is configured to switch the UE between a dormancy state and a non-dormancy state, wherein in the dormancy state the UE is configured to operate at a reduced power as compared to the non-dormancy state, and transmitting a hybrid-ARQ acknowledgment (HARQ-ACK) in response to the processor detecting the PDCCH.

Further aspects are directed to the method where the PDCCH further comprises a downlink control information (DCI) that includes the Scell dormancy indicator.

Further aspects are directed to the method where the HARQ-ACK is a one-bit ACK that indicates that the UE detected the PDCCH.

Further aspects are directed to the method further comprising: generating a codebook that includes at least one bit indicating that the method detected the PDCCH with the Scell dormancy indicator, and incorporating the codebook into the HARQ-ACK.

Further aspects are directed to the method where the codebook is a dynamic codebook or a semi-static codebook.

Further aspects are directed to the method where the PDCCH further comprises a DCI that includes the Scell dormancy indicator and a feedback timing information, and further comprising: determining a number of slots using the feedback timing information in the DCI and delaying the transmitting of the HARQ-ACK by the number of slots relative to a slot where the PDCCH is detected.

Further aspects are directed to the method where the DCI is a downlink scheduling (DL) DCI and the feedback timing information is a PDSCH-to-HARQ feedback timing indicator.

Further aspects are directed to the method where the PDCCH further comprises a DL DCI that includes the Scell dormancy indicator and a physical uplink control channel (PUCCH) resource indicator, and wherein transmitting the HARQ-ACK further comprising transmitting the HARQ-ACK in a resource indicated by the PUCCH resource indicator.

Further aspects are directed to the method where the PDCCH further comprises a DL DCI that includes the Scell dormancy indicator and a Downlink Assignment Index (DAI) field, further comprising determining a location of a bit for the HARQ-ACK in a codebook using the DAI field, and wherein transmitting the HARQ-ACK, further comprising transmitting the HARQ-ACK in the codebook at the determined location.

Further aspects are directed to the method where the PDCCH further comprises a DCI that includes the Scell dormancy indicator, and further comprising determining, using a frequency domain resource assignment (FDRA) field in the DCI, that the PDCCH is associated with a Scell dormancy indicator and is not configured to schedule data.

Further aspects are directed to the method where determining that the PDCCH is associated with the Scell dormancy indicator and is not configured to schedule the data, further comprises determining a resource allocation type zero is enabled and all bits in the FDRA are set to zero.

Further aspects are directed to the method where determining that the PDCCH is associated with the Scell dormancy indicator and is not configured to schedule the data, further comprises determining that a resource allocation type zero and a resource allocation type one are configured, the resource allocation type zero is enabled, and at least one bit in bits in the FDRA is set to zero and one bit in the FDRA is set to one.

Further aspects are directed to the method where determining that the PDCCH is associated with the Scell dormancy indicator and is not configured to schedule the data, further comprises determining that a resource allocation type one is enabled and all bits in the FDRA are set to one.

Further aspects are directed to the method where determining that the PDCCH is associated with the Scell dormancy indicator and is not configured to schedule the data, further comprises determining that a resource allocation type one is enabled and at least one bit in bits in the FDRA is set to one and one bit in the FDRA is set to zero.

Further aspects are directed to the method where the Scell dormancy indicator includes a modulation and coding scheme field in at least one DCI in the PDCCH, and further comprising modifying behavior of the UE using the modulation and coding scheme field.

Further aspects are directed to the method where the Scell dormancy indicator includes at new data indicator in at least one DCI in the PDCCH, and further comprising modifying behavior of the UE using the new data indicator.

Further aspects are directed to the method where the Scell dormancy indicator includes a redundancy version indicator in at least one DCI in the PDCCH, and further comprising modifying behavior of the UE using the redundancy version indicator.

Further aspects are directed to the method where the Scell dormancy indicator includes a HARQ process number indicator in at least one DCI in the PDCCH, and further comprising modifying behavior of the UE using the HARQ process number indicator.

Further aspects are directed to the method where the Scell dormancy indicator includes an antenna port indicator in at least one DCI in the PDCCH, and further comprising modifying behavior of the UE using the antenna port indicator.

Further aspects are directed to the method where the Scell dormancy indicator includes a demodulation reference signal (DMRS) sequence initialization indicator in at least one DCI in the PDCCH, and further comprising modifying behavior of the UE using the DMRS sequence initialization indicator.

Further aspects are directed to the method where determining an application delay associated the Scell dormancy indicator and changing a behavior of the UE based on the Scell dormancy indicator during a time period associated with the application delay.

Further aspects are directed to the method where determining that the application delay is the time period the UE switches from a dormant bandwidth part to a non-dormant bandwidth part.

Further aspects are directed to the method where the application delay is the same if the PDCCH schedules data or the PDCCH does not schedule the data.

Further aspects are directed to the method where the PDCCH further comprises a DCI that includes the Scell dormancy indicator and a sounding reference signal (SRS) request field, and further comprising transmitting the SRS instead of the HARQ-ACK as an acknowledgement that the PDCCH is detected by the UE.

Further aspects are directed to the method where the PDCCH includes a transmission power command (TPC) indicator, further comprising adjusting transmission power of a scheduled physical uplink control channel (PUCCH) using the TPC indicator and transmitting the PUCCH using the adjusted transmission power.

Further aspects are directed to the method where the PDCCH further comprises a DL DCI that includes the TPC indicator.

Further aspects are directed to the method where the TPC indicator adjusts the transmission power of the PUCCH to a serving cell depending on the Scell dormancy indicator.

Further aspects are directed to the method where the PDCCH further comprises a UL DCI that includes the Scell dormancy indicator and at least one DAI indicator, further comprising determining a location of a bit for the HARQ-ACK in a codebook using the at least one DAI field, and wherein transmitting the HARQ-ACK, further comprises transmitting the HARQ-ACK in the codebook at the determined location.

Further aspects are directed to the method where the DCI is an uplink scheduling (UP) DCI and the feedback timing information indicates delay in a second number of slots between UL grant reception in DL and UL data transmission indicated by a Time Domain Resource Assignment (TDRA) indicator.

Further aspects are directed to the method where the PDCCH further comprises a UL DCI that includes the Scell dormancy indicator, and further comprising: receiving a second PDCCH that includes a DL DCI with a PUCCH resource indicator, determining that a slot for the HARQ-ACK associated with the PDCCH that includes the UL DCI is the slot for a second HARD-ACK associated with the second PDCCH that includes the DL DCI, and transmitting the HARQ-ACK in a resource indicated in the PUCCH resource indicator in the DL DCI and using the slot.

Further aspects are directed to the method where the PDCCH further comprises a UL DCI that includes the Scell dormancy indicator, and wherein transmitting the HARQ-ACK, further comprises transmitting the HARQ-ACK in a resource indicated in an at least one of field in the UL DCI.

Further aspects are directed to the method where the PDCCH further comprises a DL or UL DCI that includes the Scell dormancy indicator and a Start and Length Indicator Value (SLIV) information in a Time Domain Resource Assignment (TDRA) indicator, further comprising determining a location of a bit for the HARQ-ACK in a semi-static codebook using the SLIV information, and wherein transmitting the HARQ-ACK, further comprises transmitting the HARQ-ACK in the semi-static codebook at the determined location.

Further aspects are directed to the method where the PDCCH further comprises a UL DCI that includes the Scell dormancy indicator and a channel state information (CSI) request field, and further comprises transmitting a CSI instead of the HARQ-ACK as an acknowledgement that the PDCCH is detected by the UE.

Aspects are directed to a non-transitory computer-readable medium having program code recorded thereon, the program code comprising, comprising: code for detecting, at a user equipment (UE) a physical downlink control channel (PDCCH) with a secondary cell (Scell) dormancy indicator, wherein the Scell dormancy indicator is configured to switch the UE between a dormancy state and a non-dormancy state, wherein in the dormancy state the UE is configured to operate at a reduced power as compared to the non-dormancy state, and code for transmitting a hybrid-ARQ acknowledgment (HARQ-ACK) in response to the processor detecting the PDCCH.

Further aspects are directed to the non-transitory computer-readable medium where the PDCCH further comprises a downlink control information (DCI) that includes the Scell dormancy indicator.

Further aspects are directed to the non-transitory computer-readable medium wherein the HARQ-ACK is a one-bit ACK that indicates that the UE detected the PDCCH.

Further aspects are directed to the non-transitory computer-readable medium further comprising: code for generating a codebook that includes at least one bit indicating that the UE detected the PDCCH with the Scell dormancy indicator, and code for incorporating the codebook into the HARQ-ACK.

Further aspects are directed to the non-transitory computer-readable medium where the codebook is a dynamic codebook or a semi-static codebook.

Further aspects are directed to the non-transitory computer-readable medium where the PDCCH further comprises a DCI that includes the Scell dormancy indicator and a feedback timing information, and further comprising: code for determining a number of slots using the feedback timing information in the DCI, and code for delaying the transmitting of the HARQ-ACK by the number of slots relative to a slot where the PDCCH is detected.

Further aspects are directed to the non-transitory computer-readable medium where the DCI is a downlink scheduling (DL) DCI and the feedback timing information is a PDSCH-to-HARQ feedback timing indicator.

Further aspects are directed to the non-transitory computer-readable medium where the PDCCH further comprises a DL DCI that includes the Scell dormancy indicator and a physical uplink control channel (PUCCH) resource indicator, and where code for transmitting the HARQ-ACK further comprising code for transmitting the HARQ-ACK in a resource indicated by the PUCCH resource indicator.

Further aspects are directed to the non-transitory computer-readable medium where the PDCCH further comprises a DL DCI that includes the Scell dormancy indicator and a Downlink Assignment Index (DAI) field, further comprising code for determining a location of a bit for the HARQ-ACK in a codebook using the DAI field, and wherein code for transmitting the HARQ-ACK, further comprising code for transmitting the HARQ-ACK in the codebook at the determined location.

Further aspects are directed to the non-transitory computer-readable medium where the PDCCH further comprises a DCI that includes the Scell dormancy indicator, and further comprising code for determining, using a frequency domain resource assignment (FDRA) field in the DCI, that the PDCCH is associated with a Scell dormancy indicator and is not configured to schedule data.

Further aspects are directed to the non-transitory computer-readable medium where code for determining that the PDCCH is associated with the Scell dormancy indicator and is not configured to schedule the data, further comprises code for determining a resource allocation type zero is enabled and all bits in the FDRA are set to zero.

Further aspects are directed to the non-transitory computer-readable medium where code for determining that the PDCCH is associated with the Scell dormancy indicator and is not configured to schedule the data, further comprises code for determining that a resource allocation type zero and a resource allocation type one are configured, the resource allocation type zero is enabled, and at least one bit in bits in the FDRA is set to zero and one bit in the FDRA is set to one.

Further aspects are directed to the non-transitory computer-readable medium where code for determining that the PDCCH is associated with the Scell dormancy indicator and is not configured to schedule the data, further comprises code for determining that a resource allocation type one is enabled and all bits in the FDRA are set to one.

Further aspects are directed to the non-transitory computer-readable medium where code for determining that the PDCCH is associated with the Scell dormancy indicator and is not configured to schedule the data, further comprises code for determining that a resource allocation type one is enabled and at least one bit in bits in the FDRA is set to one and one bit in the FDRA is set to zero.

Further aspects are directed to the non-transitory computer-readable medium where the Scell dormancy indicator includes a modulation and coding scheme field in at least one DCI in the PDCCH, and further comprising code for modifying behavior of the UE using the modulation and coding scheme field.

Further aspects are directed to the non-transitory computer-readable medium where the Scell dormancy indicator includes at new data indicator in at least one DCI in the PDCCH, and further comprising code for modifying behavior of the UE using the new data indicator.

Further aspects are directed to the non-transitory computer-readable medium where the Scell dormancy indicator includes a redundancy version indicator in at least one DCI in the PDCCH, and further comprising code for modifying behavior of the UE using the redundancy version indicator.

Further aspects are directed to the non-transitory computer-readable medium where the Scell dormancy indicator includes a HARQ process number indicator in at least one DCI in the PDCCH, and further comprising code for modifying behavior of the UE using the HARQ process number indicator.

Further aspects are directed to the non-transitory computer-readable medium where the Scell dormancy indicator includes an antenna port indicator in at least one DCI in the PDCCH, and further comprising code for modifying behavior of the UE using the antenna port indicator.

Further aspects are directed to the non-transitory computer-readable medium where the Scell dormancy indicator includes a demodulation reference signal (DMRS) sequence initialization indicator in at least one DCI in the PDCCH, and further comprising code for modifying behavior of the UE using the DMRS sequence initialization indicator.

Further aspects are directed to the non-transitory computer-readable medium further comprising: code for determining an application delay associated the Scell dormancy indicator, and code for changing a behavior of the UE based on the Scell dormancy indicator during a time period associated with the application delay.

Further aspects are directed to the non-transitory computer-readable medium further comprising: code for determining that the application delay is the time period the UE switches from a dormant bandwidth part to a non-dormant bandwidth part.

Further aspects are directed to the non-transitory computer-readable medium wherein the application delay is the same if the PDCCH schedules data or the PDCCH does not schedule the data.

Further aspects are directed to the non-transitory computer-readable medium where the PDCCH further comprises a DCI that includes the Scell dormancy indicator and a sounding reference signal (SRS) request field, and further comprising code for transmitting the SRS instead of the HARQ-ACK as an acknowledgement that the PDCCH is detected by the UE.

Further aspects are directed to the non-transitory computer-readable medium where the PDCCH includes a transmission power command (TPC) indicator, further comprising: code for adjusting transmission power of a scheduled physical uplink control channel (PUCCH) using the TPC indicator, and code for transmitting the PUCCH using the adjusted transmission power.

Further aspects are directed to the non-transitory computer-readable medium where the PDCCH further comprises a DL DCI that includes the TPC indicator.

Further aspects are directed to the non-transitory computer-readable medium where the TPC indicator adjusts the transmission power of the PUCCH to a serving cell depending on the Scell dormancy indicator.

Further aspects are directed to the non-transitory computer-readable medium where the PDCCH further comprises a UL DCI that includes the Scell dormancy indicator and at least one DAI indicator, further comprising code for determining a location of a bit for the HARQ-ACK in a codebook using the at least one DAI field, and wherein transmitting the HARQ-ACK, further comprises code for transmitting the HARQ-ACK in the codebook at the determined location.

Further aspects are directed to the non-transitory computer-readable medium where the DCI is an uplink scheduling (UP) DCI and the feedback timing information indicates delay in a second number of slots between UL grant reception in DL and UL data transmission indicated by a Time Domain Resource Assignment (TDRA) indicator.

Further aspects are directed to the non-transitory computer-readable medium where the PDCCH further comprises a UL DCI that includes the Scell dormancy indicator, and further comprising: code for receiving a second PDCCH that includes a DL DCI with a PUCCH resource indicator, code for determining that a slot for the HARQ-ACK associated with the PDCCH that includes the UL DCI is the slot for a second HARD-ACK associated with the second PDCCH that includes the DL DCI, and code for transmitting the HARQ-ACK in a resource indicated in the PUCCH resource indicator in the DL DCI and using the slot.

Further aspects are directed to the non-transitory computer-readable medium where the PDCCH further comprises a UL DCI that includes the Scell dormancy indicator, and wherein code for transmitting the HARQ-ACK, further comprises code for transmitting the HARQ-ACK in a resource indicated in an at least one of field in the UL DCI.

Further aspects are directed to the non-transitory computer-readable medium the PDCCH further comprises a DL or UL DCI that includes the Scell dormancy indicator and a Start and Length Indicator Value (SLIV) information in a Time Domain Resource Assignment (TDRA) indicator, further comprising code for determining a location of a bit for the HARQ-ACK in a semi-static codebook using the SLIV information, and wherein code for transmitting the HARQ-ACK, further comprises code for transmitting the HARQ-ACK in the semi-static codebook at the determined location.

Further aspects are directed to the non-transitory computer-readable medium wherein the PDCCH further comprises a UL DCI that includes the Scell dormancy indicator and a channel state information (CSI) request field, and further comprises code for transmitting a CSI instead of the HARQ-ACK as an acknowledgement that the PDCCH is detected by the UE.

Aspects are directed to a user equipment (UE), comprising: means for detecting a physical downlink control channel (PDCCH) with a secondary cell (Scell) dormancy indicator, wherein the Scell dormancy indicator is configured to switch the UE between a dormancy state and a non-dormancy state, wherein in the dormancy state the UE is configured to operate at a reduced power as compared to the non-dormancy state, and means for transmitting a hybrid-ARQ acknowledgment (HARQ-ACK) in response to the processor detecting the PDCCH.

Further aspects are directed to the UE where the PDCCH further comprises a downlink control information (DCI) that includes the Scell dormancy indicator.

Further aspects are directed to the UE where the HARQ-ACK is a one-bit ACK that indicates that the UE detected the PDCCH.

Further aspects are directed to the UE further comprising: means for generating a codebook that includes at least one bit indicating that the UE detected the PDCCH with the Scell dormancy indicator, and means for incorporating the codebook into the HARQ-ACK.

Further aspects are directed to the UE where the codebook is a dynamic codebook or a semi-static codebook.

Further aspects are directed to the UE where the PDCCH further comprises a DCI that includes the Scell dormancy indicator and a feedback timing information, and further comprising: means for determining a number of slots using the feedback timing information in the DCI, and means for delaying the transmitting of the HARQ-ACK by the number of slots relative to a slot where the PDCCH is detected.

Further aspects are directed to the UE where the DCI is a downlink scheduling (DL) DCI and the feedback timing information is a PDSCH-to-HARQ feedback timing indicator.

Further aspects are directed to the UE where the PDCCH further comprises a DL DCI that includes the Scell dormancy indicator and a physical uplink control channel (PUCCH) resource indicator, and wherein means for transmitting the HARQ-ACK further comprising means for transmitting the HARQ-ACK in a resource indicated by the PUCCH resource indicator.

Further aspects are directed to the UE where the PDCCH further comprises a DL DCI that includes the Scell dormancy indicator and a Downlink Assignment Index (DAI) field, further comprising means for determining a location of a bit for the HARQ-ACK in a codebook using the DAI field, and wherein means for transmitting the HARQ-ACK, further comprising means for transmitting the HARQ-ACK in the codebook at the determined location.

Further aspects are directed to the UE where the PDCCH further comprises a DCI that includes the Scell dormancy indicator, and further comprising means for determining, using a frequency domain resource assignment (FDRA) field in the DCI, that the PDCCH is associated with a Scell dormancy indicator and is not configured to schedule data.

Further aspects are directed to the UE where means for determining that the PDCCH is associated with the Scell dormancy indicator and is not configured to schedule the data, further comprises means for determining a resource allocation type zero is enabled and all bits in the FDRA are set to zero.

Further aspects are directed to the UE where means for determining that the PDCCH is associated with the Scell dormancy indicator and is not configured to schedule the data, further comprises means for determining that a resource allocation type zero and a resource allocation type one are configured, the resource allocation type zero is enabled, and at least one bit in bits in the FDRA is set to zero and one bit in the FDRA is set to one.

Further aspects are directed to the UE where means for determining that the PDCCH is associated with the Scell dormancy indicator and is not configured to schedule the data, further comprises means for determining that a resource allocation type one is enabled and all bits in the FDRA are set to one.

Further aspects are directed to the UE where means for determining that the PDCCH is associated with the Scell dormancy indicator and is not configured to schedule the data, further comprises means for determining that a resource allocation type one is enabled and at least one bit in bits in the FDRA is set to one and one bit in the FDRA is set to zero.

Further aspects are directed to the UE where the Scell dormancy indicator includes a modulation and coding scheme field in at least one DCI in the PDCCH, and further comprising means for modifying behavior of the UE using the modulation and coding scheme field.

Further aspects are directed to the UE where the Scell dormancy indicator includes at new data indicator in at least one DCI in the PDCCH, and further comprising means for modifying behavior of the UE using the new data indicator.

Further aspects are directed to the UE where the Scell dormancy indicator includes a redundancy version indicator in at least one DCI in the PDCCH, and further comprising means for modifying behavior of the UE using the redundancy version indicator.

Further aspects are directed to the UE where the Scell dormancy indicator includes a HARQ process number indicator in at least one DCI in the PDCCH, and further comprising means for modifying behavior of the UE using the HARQ process number indicator.

Further aspects are directed to the UE where the Scell dormancy indicator includes an antenna port indicator in at least one DCI in the PDCCH, and further comprising means for modifying behavior of the UE using the antenna port indicator.

The UE of aspect 101, wherein the Scell dormancy indicator includes a demodulation reference signal (DMRS) sequence initialization indicator in at least one DCI in the PDCCH, and further comprising means for modifying behavior of the UE using the DMRS sequence initialization indicator.

Further aspects are directed to the UE further comprising: means for determining an application delay associated the Scell dormancy indicator and means for changing a behavior of the UE based on the Scell dormancy indicator during a time period associated with the application delay.

Further aspects are directed to the UE further comprising: means for determining that the application delay is the time period the UE switches from a dormant bandwidth part to a non-dormant bandwidth part.

Further aspects are directed to the UE where the application delay is the same if the PDCCH schedules data or the PDCCH does not schedule the data.

Further aspects are directed to the UE where the PDCCH further comprises a DCI that includes the Scell dormancy indicator and a sounding reference signal (SRS) request field, and further comprising means for transmitting the SRS instead of the HARQ-ACK as an acknowledgement that the PDCCH is detected by the UE.

Further aspects are directed to the UE where the PDCCH includes a transmission power command (TPC) indicator, further comprising: means for adjusting transmission power of a scheduled physical uplink control channel (PUCCH) using the TPC indicator and means for transmitting the PUCCH using the adjusted transmission power.

Further aspects are directed to the UE where the PDCCH further comprises a DL DCI that includes the TPC indicator.

Further aspects are directed to the UE where the TPC indicator adjusts the transmission power of the PUCCH to a serving cell depending on the Scell dormancy indicator.

Further aspects are directed to the UE where the PDCCH further comprises a UL DCI that includes the Scell dormancy indicator and at least one DAI indicator, further comprising means for determining a location of a bit for the HARQ-ACK in a codebook using the at least one DAI field, and wherein transmitting the HARQ-ACK, further comprises means for transmitting the HARQ-ACK in the codebook at the determined location.

Further aspects are directed to the UE where the DCI is an uplink scheduling (UP) DCI and the feedback timing information indicates delay in a second number of slots between UL grant reception in DL and UL data transmission indicated by a Time Domain Resource Assignment (TDRA) indicator.

Further aspects are directed to the UE where the PDCCH further comprises a UL DCI that includes the Scell dormancy indicator, and further comprising: means for receiving a second PDCCH that includes a DL DCI with a PUCCH resource indicator, means for determining that a slot for the HARQ-ACK associated with the PDCCH that includes the UL DCI is the slot for a second HARD-ACK associated with the second PDCCH that includes the DL DCI, and means for transmitting the HARQ-ACK in a resource indicated in the PUCCH resource indicator in the DL DCI and using the slot.

Further aspects are directed to the UE where the PDCCH further comprises a UL DCI that includes the Scell dormancy indicator, and wherein means for transmitting the HARQ-ACK, further comprises means for transmitting the HARQ-ACK in a resource indicated in an at least one of field in the UL DCI.

Further aspects are directed to the UE where the PDCCH further comprises a DL or UL DCI that includes the Scell dormancy indicator and a Start and Length Indicator Value (SLIV) information in a Time Domain Resource Assignment (TDRA) indicator, further comprising means for determining a location of a bit for the HARQ-ACK in a semi-static codebook using the SLIV information, and wherein means for transmitting the HARQ-ACK, further comprises means for transmitting the HARQ-ACK in the semi-static codebook at the determined location.

Further aspects are directed to the UE where the PDCCH further comprises a UL DCI that includes the Scell dormancy indicator and a channel state information (CSI) request field, and further comprises means for transmitting a CSI instead of the HARQ-ACK as an acknowledgement that the PDCCH is detected by the UE.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
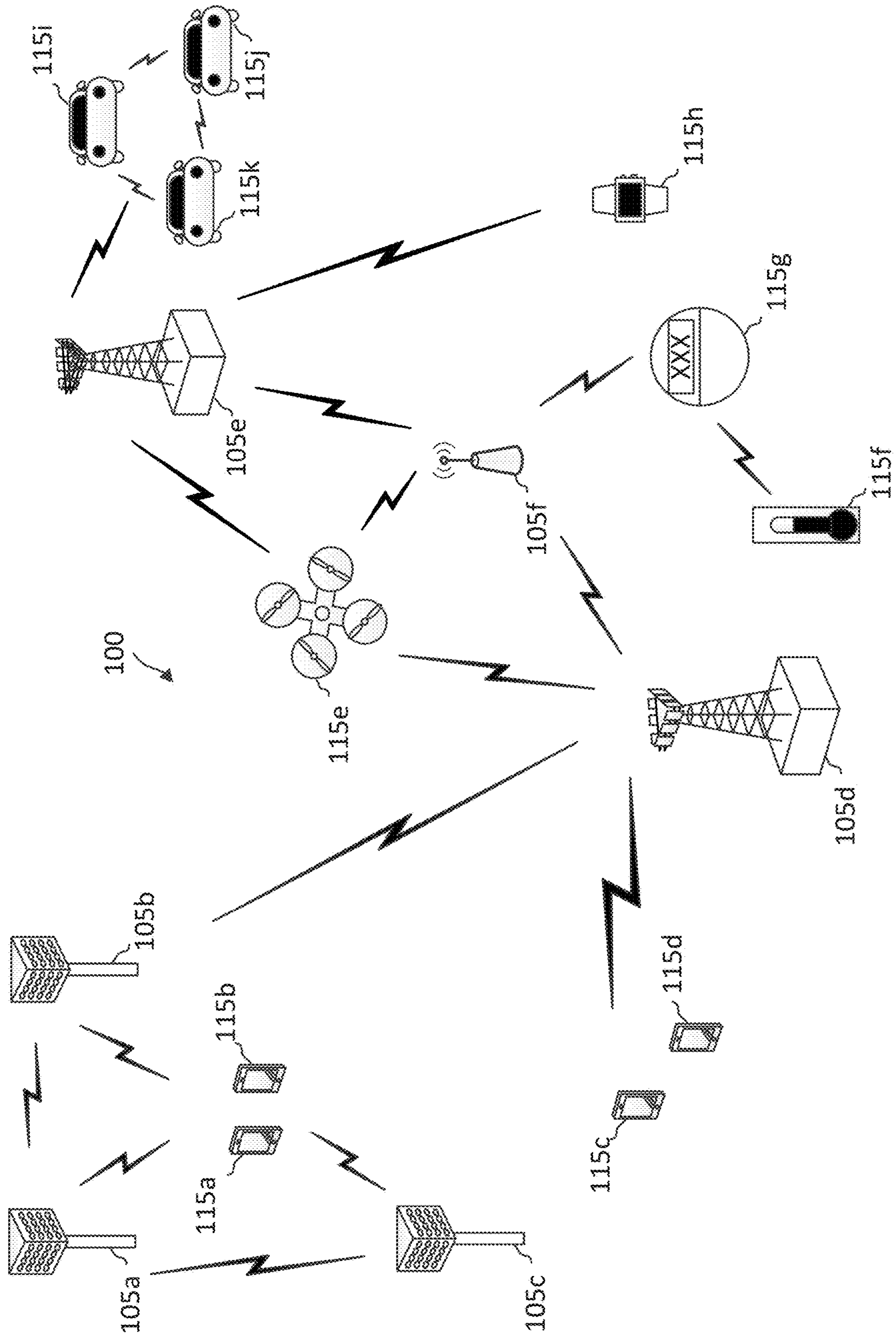
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/$km^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHZ, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*c*, and 105*f*) and other network entities. A BS 105 may be a station that communicates with UEs 115 and may also be referred to as an evolved node B (CNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*c* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, entertainment device, vehicle, vehicular component, radio module, industrial equipment, medical/health devices, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*c*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*c*, which may be a drone. Redundant communication links with the UE 115*c* may include links from the macro BSs 105*d* and 105*c*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*c*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such asV2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be a NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

As discussed above, A BS 105 may provide communication coverage for a macro cell or a small. In the NR network, UE 115 may also be configured to communicate with multiple cells, referred to as serving cells, which may be one or more macro cells or small cells provided by BSs 105. In some aspects, serving cells may include one primary cell (Pcell) and multiple secondary cells (Scells). The Pcell may be operating on primary frequency and is the cell where UE 115 either performs an initial connection establishment procedure or initiates a reconnection establishment procedure where UE 115 receives the RRC. A Scell may be operating on a secondary frequency, which may be configured once an RRC connection is established and which may be used to provide additional radio resources to UE 115. UE 115 may communicate with multiple Scells.

To conserve resources, in some aspects, UE 115 may be configured for one or more operational states (e.g., first state, second state, non-dormancy-like state, and/or dormancy-like state). In the non-dormancy like state behavior, UE 115 may fully utilize resources of the Scells. For example, UE 115 may monitor PDCCH, receive PDSCH, receive CSI, and measure and report frequencies. UE 115 may also operate at full power thus fully utilizing the resources available in the Scell. In dormancy-like behavior, UE 115 may conserve power by reducing activity associated with the Scell. For example, while in the dormancy-like behavior, UE 115 may not monitor PDCCH, may not receive PDSCH or PUSCH transmissions, eliminate CSI report, and reduce CSI measurement (e.g., at least by 100 ms) and reduce reporting frequency operations in some aspects. Further, when UE 115 communicates with multiple Scells, UE 115 may be in the non-dormancy-like state with some Scells and be in the dormancy-like state with other Scells.

In some aspects, network 100, using e.g. BS 105 may switch one or more Scells configured for UE 115 between non-dormancy-like and dormancy-like states. A switch may include transmitting a Scell dormancy indication field (or simply dormancy indication field). The dormancy indication field may apply to an individual Scell or to a group of Scells when multiple Scells are configured to UE 115. In some instance the dormancy indication field may be included in the PDCCH. Although the aspects below are discussed from the perspective of the PDCCH, the aspects are also applicable to other control channels.

Figure 2:
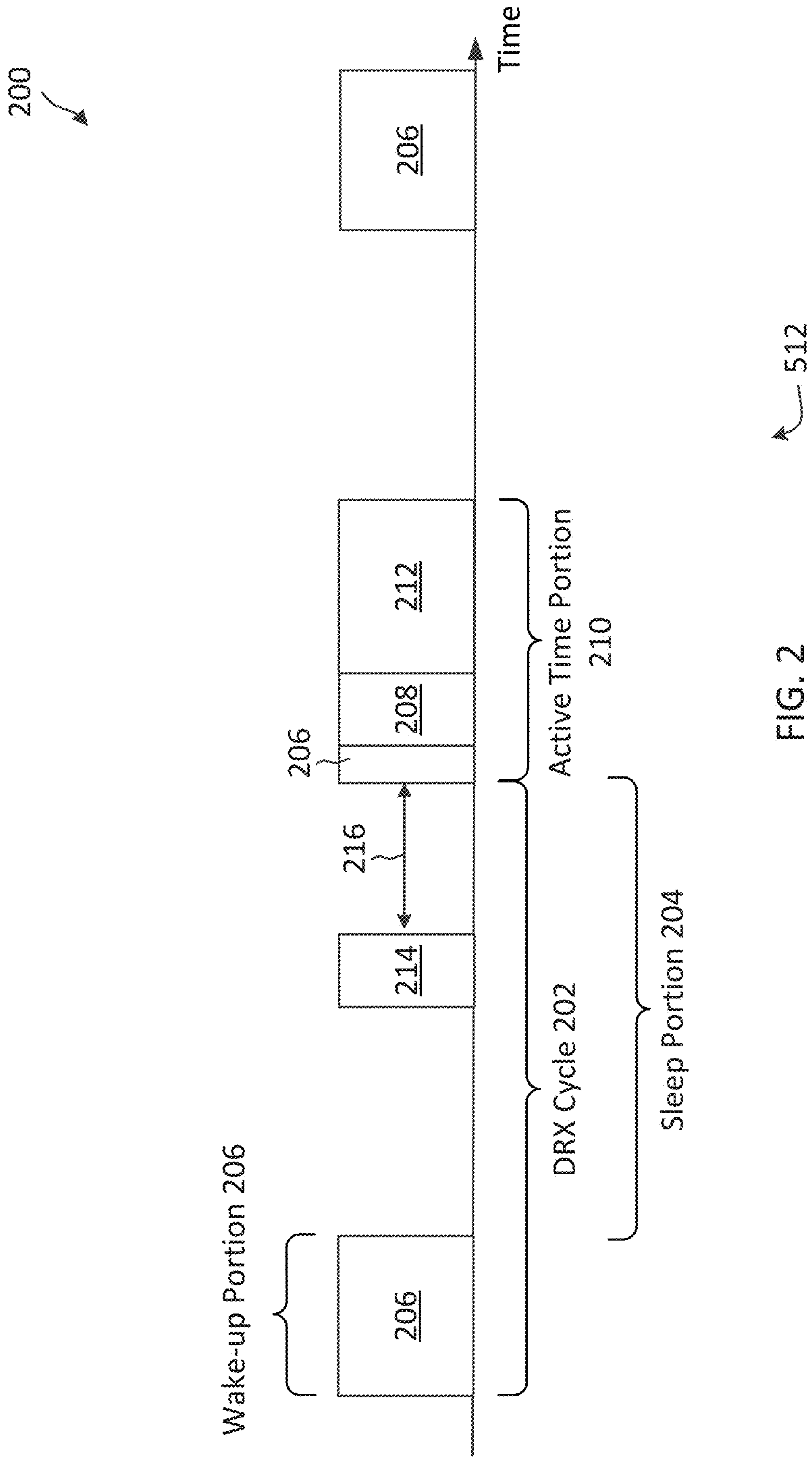
FIG. 2 is a block diagram illustrating a discontinuous reception (DRX), according to some aspects of the present disclosure.

In some aspects, UE 115 may be configured to perform a discontinuous reception (DRX). In the DRX, UE 115 may sleep to save power and wake up periodically to monitor a PDCCH for a potential DL reception or control information for a UL transmission. FIG. 2 is a block diagram illustrating a DRX reception, according to some aspects. As illustrated in FIG. 2, a DRX cycle 202 includes a sleep portion 204 and a wake-up portion 206 (also referred to as an on-duration portion 206). During the on-duration portion 206, UE 115 may monitor for a PDCCH 208 that may schedule data transmissions for UE 115. In some instances, UE 115 may receive PDCCH 208 during the on-duration portion 206. In this case, UE 115 may extend the on-duration portion 206 by waking up and entering into an active time portion 210. During the active time portion 210, UE 115 may receive data 212.

In some instances, during a sleep portion 204 of the DRX cycle 202, UE 115 may receive a wake-up signal (WUS). The WUS may indicate to UE 115 to wake up to enter the on-duration portion 206 and monitor for PDCCH 208. A WUS may also include a PDCCH and can be a PDCCH WUS 214. UE 115 may monitor for PDCCH WUS 214 outside of active time portion 210 and typically during the sleep portion 204. When UE 115 receives the PDCCH WUS 214, UE 115 may wake-up and enter an on-duration portion 206 after a configurable time period, which may be a WUS offset 216. When UE 115 completes the active time portion 210 or when UE 115 completes the on-duration portion 206 without receiving the PDCCH 208, UE 115 may again enter a sleep portion 204 of DRX cycle 202.

In some aspects, UE 115 may not be configured to perform DRX cycle 202. In these cases, UE 115 does not enter a power save mode and may always monitor for PDCCH 208.

In some aspects, PDCCH 208 or PDCCH WUS 214 may contain a Scell dormancy indication field. If UE 115 is configured with DRX cycle 202, the Scell dormancy indication field may be included in the PDCCH WUS 214 that UE 115 receives during sleep portion 204 or in the PDCCH 208 that UE 115 receives during active time portion 210. If UE 115 is not configured with DRX cycle 202, UE 115 may receive the PDCCH 208 at any time.

In some aspects, the Scell dormancy indication field is a dormancy indication field that may indicate dormancy-like or non-dormancy-like states for a Scell. When UE 115 groups multiple Scells into one or more groups, the Scell dormancy indication field may indicate dormancy-like or non-dormancy-like states for each group of the Scells.

In some aspects, the UE 115 switching between dormancy-like and non-dormancy-like states may be realized by a bandwidth part (BWP) switching between a dormant BWP and a regular BWP. The regular BPW allows UE 115 a full utilization of the Scell or a group of Scells, while a dormant BWP allows UE 115 a limited utilization of a Scell or a group of Scells.

As discussed above, the PDCCH, such as PDCCH 208 may include a DCI. The DCI may be in various formats. BS 105 may use DCI format 1_1 for scheduling DL transmission and DCI format 0_1 for scheduling UL transmission. The DCI formats may be extended and/or modified to include the Scell dormancy indication fields. In this way, PDCCH 208 may include one or more fields that may change the dormancy state of one or more Scells. In addition to the dormancy fields the PDCCH 208 may also include information for scheduling data.

In some aspects, after UE 115 receives the PDCCH 208 that includes the Scell dormancy indication field, UE 115 may generate a hybrid ARQ acknowledgment, or HARQ-ACK. Generally, BS 105 may configure UE 115 with a HARQ codebook for HARQ ACK/NACK feedback. For instance, the UE 115 may indicate to the BS HARQ ACK/NACK feedbacks for multiple PDSCH transport blocks. The UE 115 may select a codeword from the HARQ codebook corresponding to the HARQ ACK/NACK feedbacks and indicate the codeword to the BS 105. The HARQ codebook may be dependent on various parameters (e.g., size or the number of codewords). In some instances, the BS 105 may configure the HARQ codebook semi-statically, where the HARQ codebook configuration parameters may not change for a duration of time. In some other instances, the BS 105 may configure the HARQ codebook dynamically, where the HARQ codebook configuration parameters may be dynamically updated. Further, the size of the semi-static codebook is fixed based on the RRC configuration of the codebook. As such, the size of the semi-static codebook accounts for all possible downlink transmission opportunities in the configured time window. The size of a dynamic codebook changes based on the actual downlink transmissions that are acknowledged by UE 115 associated with the codebook.

Figure 3:
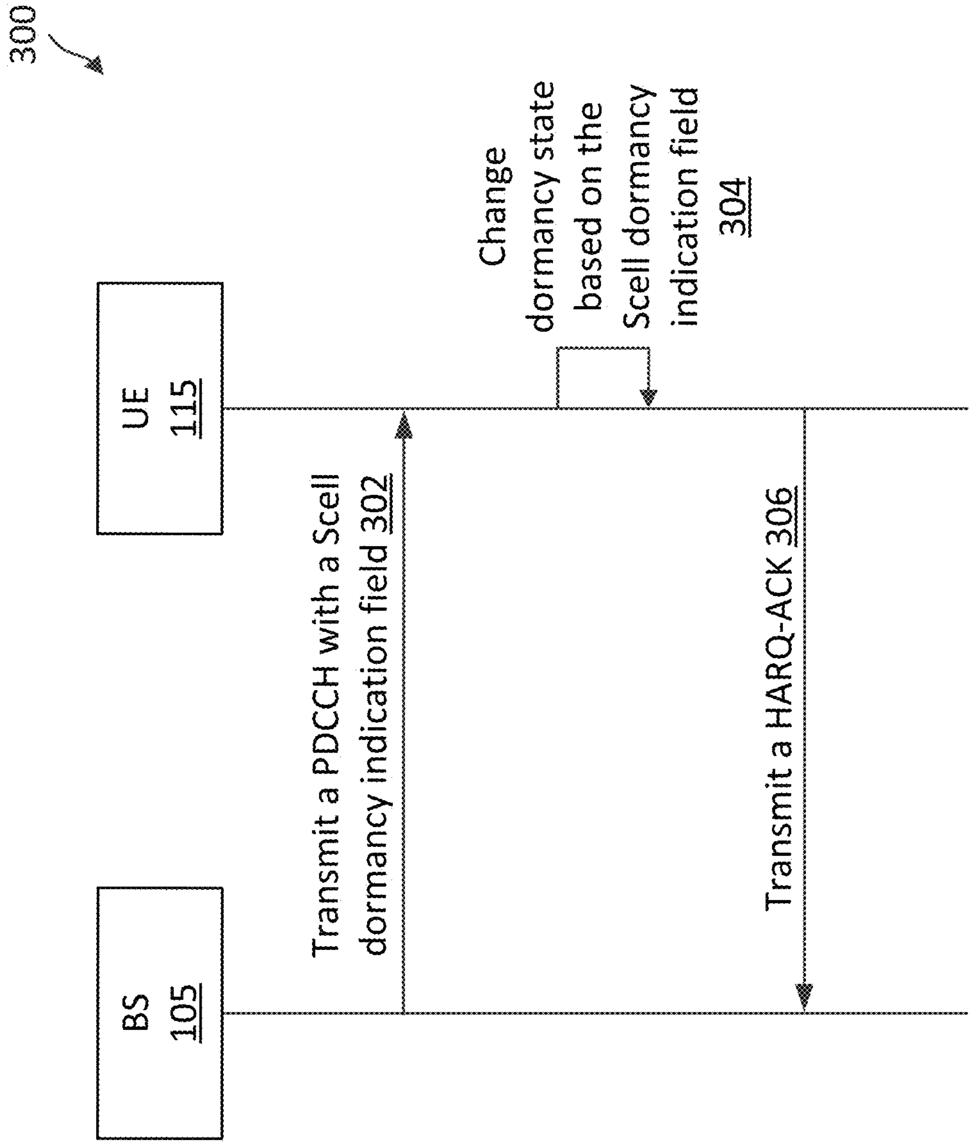
FIG. 3 is a flow diagram for communicating a physical downlink control channel (PDCCH) between a base station and a user equipment, according to some aspects of the present disclosure.

FIG. 3 is a flow diagram 300 for communicating a physical downlink control channel (PDCCH) between a base station and a user equipment, according to some aspects of the present disclosure. As illustrated in FIG. 3, at step 302, BS 105 transmits the PDCCH 208 to UE 115. The PDCCH 208 includes a Scell dormancy indication field in the DCI. At step 304, UE 115 receives and processes the Scell dormancy indication field included in the DCI. For example, UE 115 may change its dormancy state based on the Scell dormancy indication field. For example, UE 115 may enter into a dormancy-like state with respect to one or more Scells (or vice versa). At step 306, UE 115 transmits a HARQ-ACK to BS 105 in response to receiving the PDCCH 208 with the Scell dormancy indication field in the DCI. Because UE 115 transmits the HARQ-ACK to BS 105, BS 105 and UE 115 may have the same understanding as to which Scells associated with UE 115 are in the dormancy-like state and in the non-dormancy-like state. Further, the UE 115 communicating a HARQ-ACK after receiving the PDCCH 208 avoids a scenario where BS 105 transmits the PDCCH 208 with a Scell dormancy indication field which UE 115 fails to detect and causes the BS 105 and UE 115 to be misaligned about the dormancy-like state and non-dormancy like state of the Scells associated with the UE 115. When BS 105 receives a HARQ-ACK from the UE 115 in response to transmitting the PDCCH 208, the BS 105 receives a confirmation that UE 115 received PDCCH 208 and has changed its dormancy-like state as indicated in the Scell dormancy indication field.

In some aspects, the HARQ-ACK information in the HARQ-ACK may be transmitted as a single bit. For example, if the PDCCH 208 indicates dormancy for Scells but does not schedule data based on an DL scheduling DCI (DL DCI) format, the UE 115 may generate a one-bit ACK if UE 115 detects the PDCCH 208. In another example, if the PDCCH 208 indicates dormancy for Scells but does not schedule data based on a UL scheduling DCI (UL DCI) format, the UE 115 may generate a one-bit ACK if UE 115 detects the PDCCH 208.

In some aspects, network 100 may support multiplexing of HARQ-ACK information from multiple DL receptions. For example, different DL transmissions from the same serving cell or across different service cells) may be multiplexed into a multi-bit message. The bits may be multiplexed using the RRC selection into a semi-static codebook or a dynamic codebook. The semi-static codebook may include bits reserved for all potential DL transmissions by BS 105 in slots associated with the codebook for specific transmission, e.g. the PDCCH 208 with the Scell dormancy indication field. The dynamic codebook may include bits that correspond to the actual DL transmissions by BS 105, e.g. bits that correspond to the PDCCH 208 with Scell dormancy indication field when the Scell dormancy indication field is actually included in the PDCCH 208. Accordingly, when UE 115 receives the PDCCH 208 with the Scell dormancy indication field, UE 115 may generate a HARQ-ACK that supports a semi-static codebook for reporting to BS 105 that UE 115 received the PDCCH 208. Alternatively, UE 115 may generate a HARQ-ACK that supports a dynamic-static codebook for reporting to BS 105 that UE 115 received the PDCCH 208.

Figure 4A:
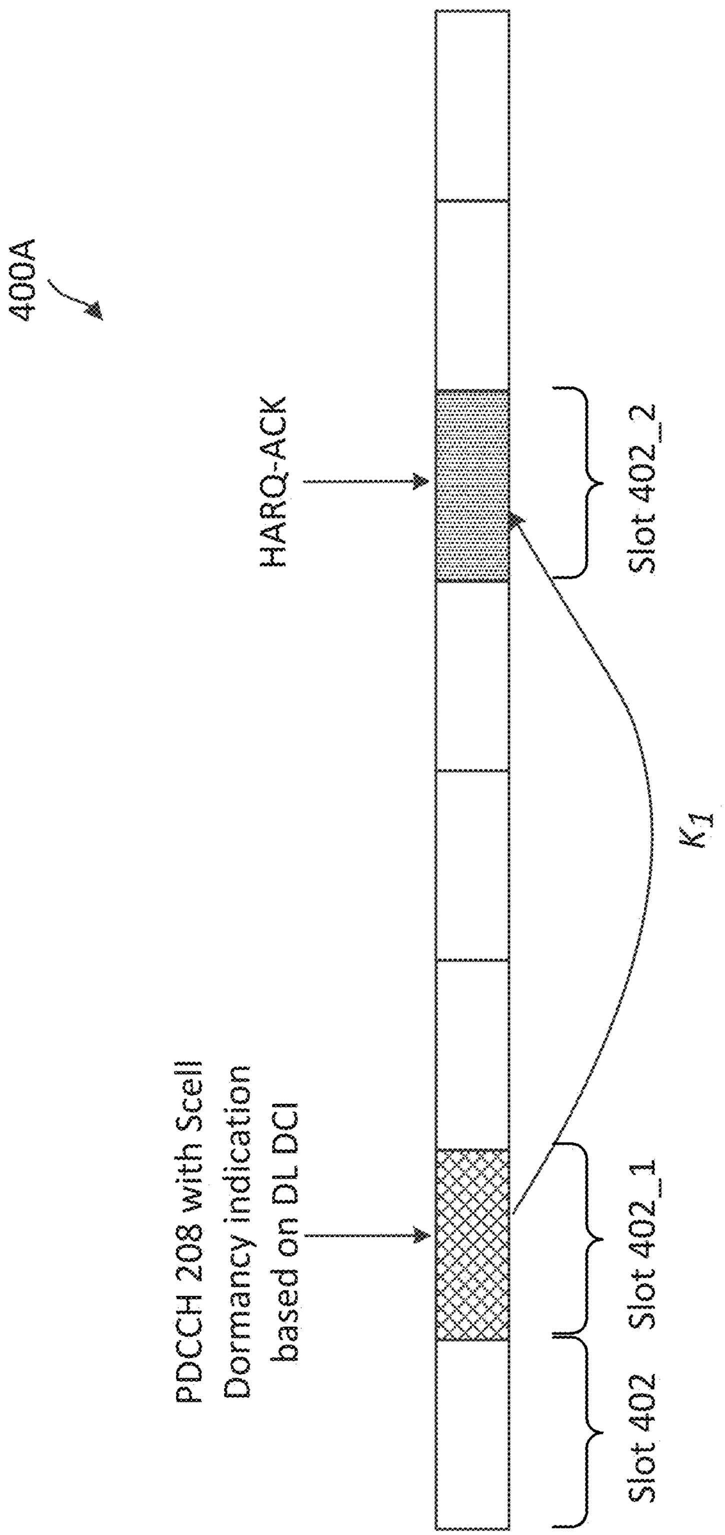
FIGS. 4A-4C are block diagrams for configuring a slot for a HARQ-ACK using a downlink control information, according to some aspects of the present disclosure.
Figure 4B:
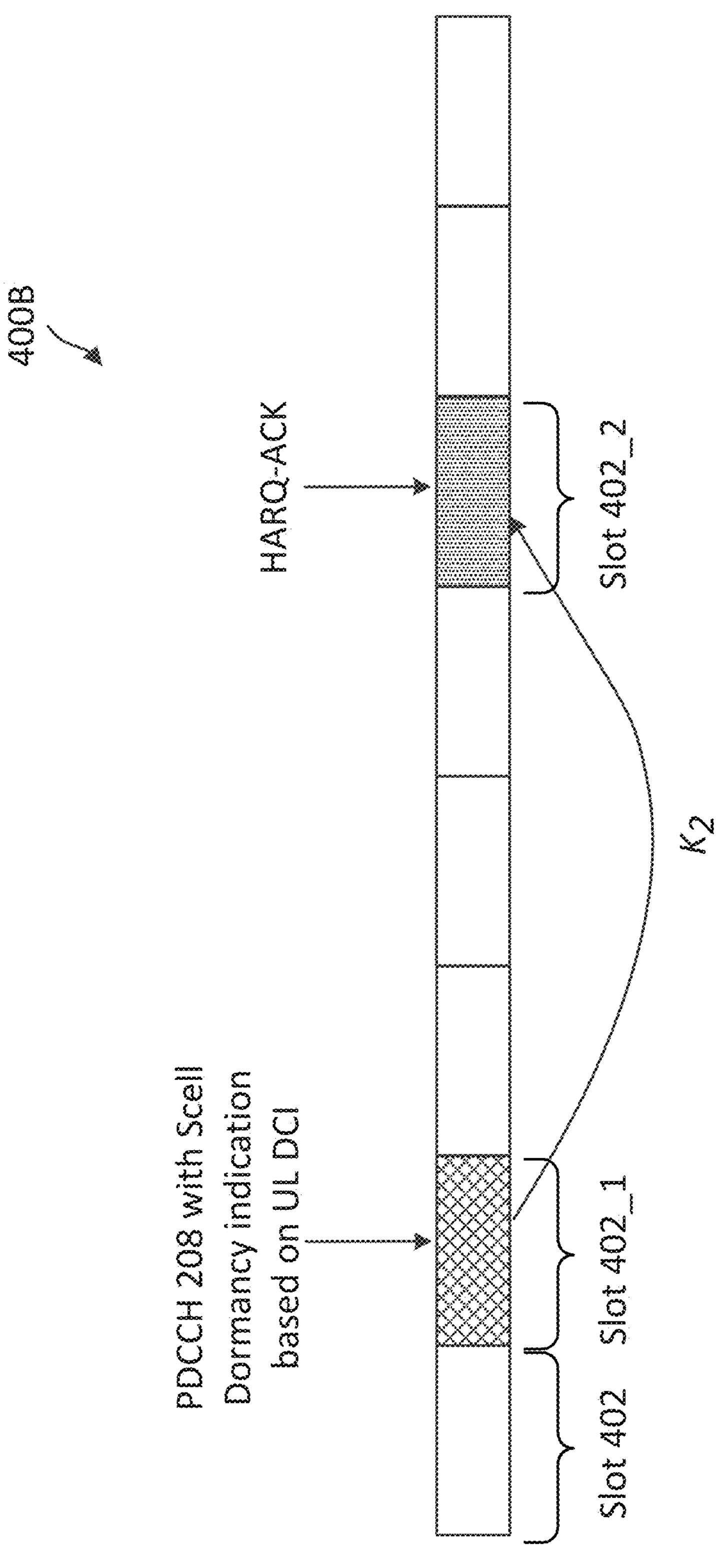
Figure 4C:
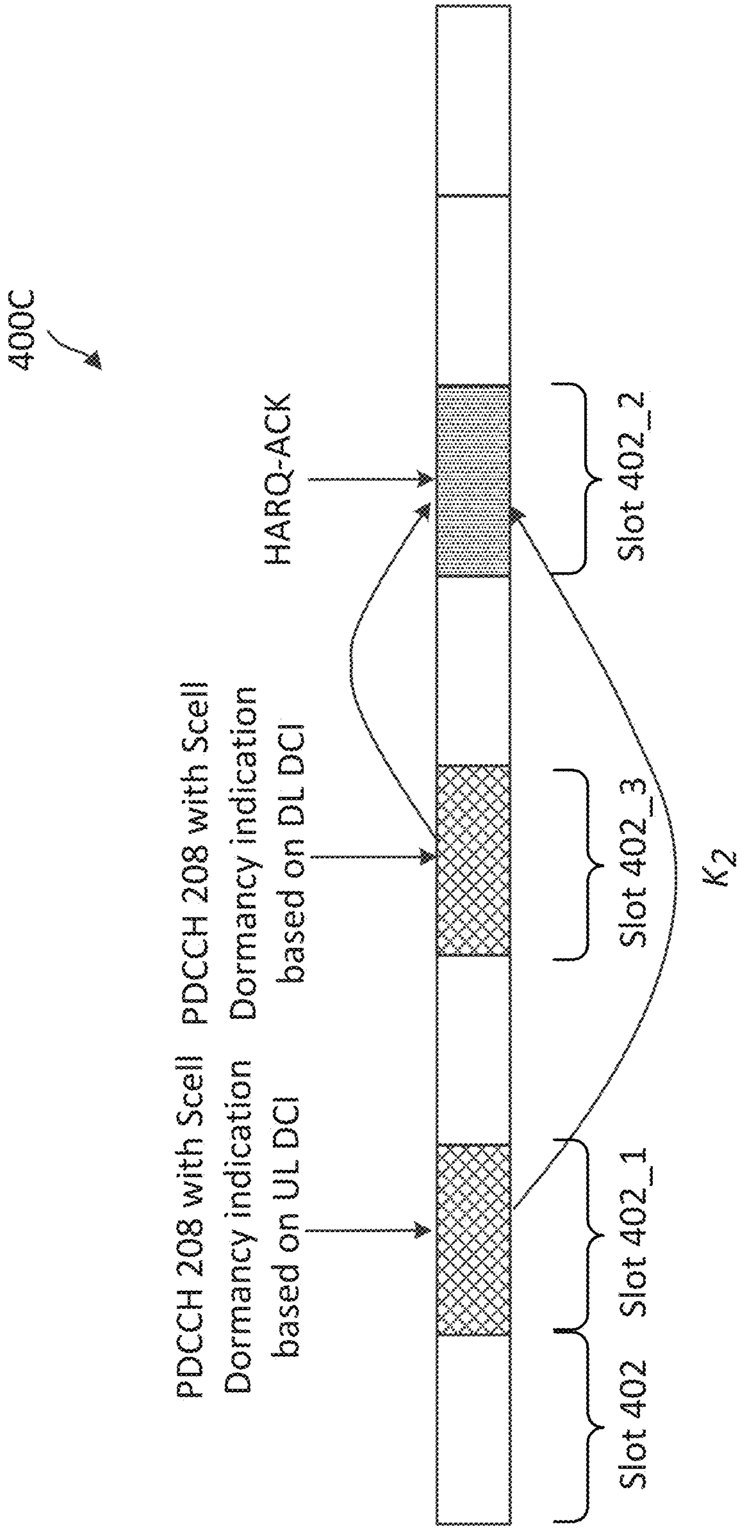

In some aspects, when the Scell dormancy indication field is included in DL DCI, BS 105 may also configure a slot that UE 115 may use to transmit the HARQ-ACK back to BS 105. In one instance, the slot for the HARQ-ACK may be included in one of the fields in the DL DCI, such as a HARQ feedback timing information that provides a delay in slots between the slot where UE 115 receives the PDCCH 208 and the slot where UE 115 transmits a corresponding HARQ-ACK. The slot may support the HARQ-ACK that may include a single bit, a semi-static codebook, or a dynamic codebook. FIGS. 4A-C are block diagrams 400A-400C for configuring a slot for a HARQ-ACK, according to some aspects of the present disclosure. FIG. 4A illustrates multiple slots 402. Slots 402_1 may carry the PDCCH 208 that includes a Scell dormancy indication field and a PDSCH-to-HARQ feedback timing indicator field in the DL DCI. The PDSCH-to-HARQ feedback timing indicator field may include a value K/that stores a number of slots 402 that are between slot 402_1 that includes PDCCH 208 and slot 402_2 that includes the HARQ-ACK. Accordingly, K corresponds to a delay between UE 115 receiving PDCCH 208 via the DL DCI, and UE 115 responding to the PDCCH 208 with the HARQ-ACK.

As illustrated in FIG. 4B, the PDCCH 208 includes a Time Domain Resource Assignment field for the UL scheduling DCI. Unlike the DL scheduling DCI, UL scheduling DCI may not have a PDSCH-to-HARQ feedback timing indicator field. In this case, the UL DCI may store a number of slots that correspond to a delay between the UE 115 receiving the PDCCH 208 and UE 115 transmitting the HARQ-ACK in a Time Domain Resource Assignment (TDRA) field. Once the UE 115 receives the PDCCH 208, the UE 115 may use the value in the Time Domain Resource Assignment (TDRA) field in the UL DCI to determine a number of slots that correspond to a delay. The value in the TDRA field may be referred to as $K_2$. The UE 115 may use the value in $K_2$ to identify the slot that UE 115 may use to transmit the HARQ-ACK back to the BS 105. As discussed above, the HARQ-ACK may be a single bit HARQ-ACK or be included in a semi-static codebook or a dynamic codebook.

In some aspects, UE 115 may determine the PUCCH resources that may be used to transmit HARQ-ACK. When UE 115 receives a DL DCI in the PDCCH 208, the UE 115 may use a PUCCH resource indicator field to determine the PUCCH resource that UE 115 may use for HARQ-ACK transmission. In some instances, UE 115 may use the PUCCH resource indicator field to determine a resource for the HARQ-ACK transmission when the PDCCH 208 that UE 115 receives is the last one to be acknowledged in the slot where the corresponding HARQ-ACK codebook is transmitted. When the UE 115 may use the PUCCH resource indicator field, the UE 115 may store the PUCCH resource indicator field from the DL DCI.

However, when UE 115 receives a UL DCI in the PDCCH 208, the UL DCI may not have a PUCCH resource indicator field. In this case, the UE 115 may transmit a HARQ-ACK for the PDCCH 208 with the UL DCI only if the UE 115 transmits a HARQ-ACK for another DL reception (e.g. PDCCH 208 with the DL DCI) in the same slot and the DL DCI includes a valid PUCCH resource indicator field. FIG. 4C illustrates a block diagram that communicates a HARQ-ACK, according to some aspects of the disclosure. As illustrated in FIG. 4C, UE 115 receives the PDCCH 208 with the Scell dormancy indication field in UL DCI in slot 402_1. Because the UL DCI does not have a PUCCH resource indicator field, UE 115 may wait to receive a DL reception that includes the PDCCH 208 with the Scell dormancy indication field in the DL DCI or the PDCCH schedules a unicast PDSCH, which UE 115 receives in slot 402_2. As discussed above, the DL DCI of the PDCCH 208 that the UE 115 receives in slot 402_2 may include a PUCCH resource indicator field. In this case, UE 115 may determine whether the HARQ-ACK associated with the PUCCH from the DL reception is in the same slot as the HARQ-ACK associated with the PUCCH from the UL reception. If so, UE 115 may transmit the HARQ-ACK for PUCCHs associated with the DL and UL receptions in the same slot using and using PUCCH resource indicator field. As illustrated in FIG. 4C, slot 402_3 is the slot that may be used to transmit the HARQ-ACK associated with the PUCCHs from the DL and UL receptions.

In an alternative aspect, UL DCI in PDCCH 208 may reuse another field or a combination of multiple fields to carry PUCCH resource indicator for HARQ-ACK transmission associated with PDCCH 208.

As discussed above, UE 115 may transmit the HARQ-ACK using a semi-static or dynamic codebook. The UE 115 may determine a location of a HARQ-ACK bit in a semi-static or dynamic codebook. In one aspect, when UE 115 receives the PDCCH that includes a DL DCI, UE 115 may determine location of the HARQ-ACK bit for the PDCCH 208 in the semi-static codebook using a start and length indicator value (SLIV) information. The SLIV information may be included in the TDRA field in the DL DCI. UE 115 may also resolve an overlap between multiple PDCCHs and sort multiple PDCCHs based on their corresponding SLIVs in the same slot. The UE 115 may store the DL DCI in order to obtain the SLIV information from the DL DCI.

Similarly, when UE 115 receives the PDCCH 208 that includes a UL DCI, the UE 115 may determine the location of the HARQ-ACK bit for the PDCCH in the semi-static codebook using the SLIV information. The SLIV information may be included in the TDRA field in the UL DCI. The UE 115 may also resolve an overlap between multiple PDCCHs and sort multiple PDCCHs based on their corresponding SLIVs in the same slot. The UE 115 may store the UL DCI in order to obtain the SLIV information from the UL DCI.

In another aspect, when the UE 115 receives the PDCCH 208 that includes a DL DCI, UE 115 may determine location for the HARQ-ACK bit for the PDCCH 208 in the dynamic codebook using a Downlink Assignment Index (DAI) field in DL DCI. The rules for determining the location for the HARQ-ACK bit may be similar to the rules for determining location of the HARQ-ACK bit in the dynamic codebook for a unicast PDSCH. UE 115 may store the DL DCI in order to obtain the DAI field from the UL DCI.

Similarly, when the UE 115 receives the PDCCH 208 that includes a UL DCI, the UE 115 may determine the location for the HARQ-ACK bit for the PDCCH 208 in the dynamic codebook using a Downlink Assignment Index (DAI) field in UL DCI or a combination of DAI fields if more than one DAI field is provided by the UL DCI. The rules for determining the location for the HARQ-ACK bit may be similar to the rules for determining location of the HARQ-ACK bit in the dynamic codebook for a unicast PDSCH. UE 115 may store UL DCI in order to obtain the DAI field from UL DCI.

Figure 5:
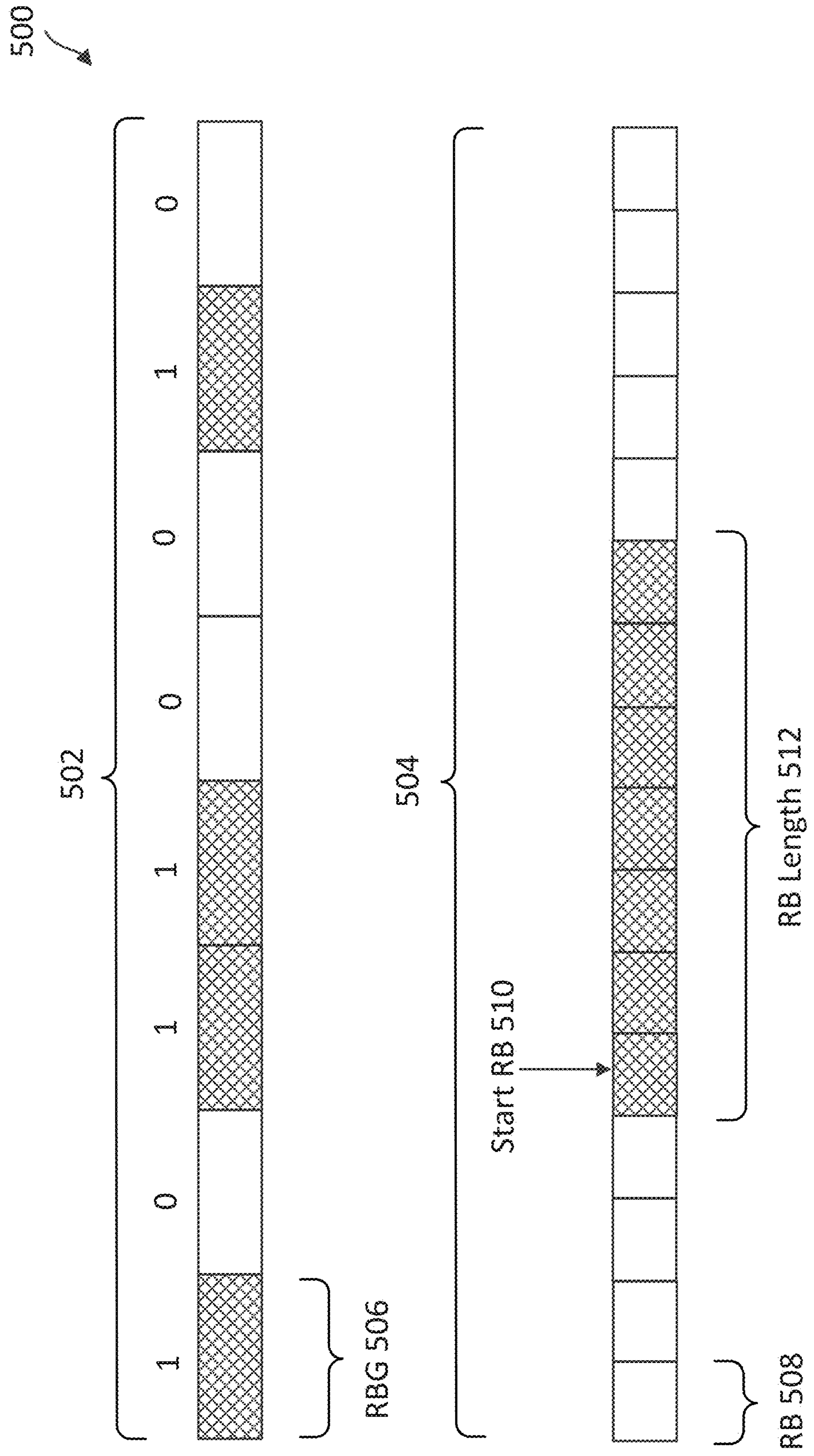
FIG. 5 is a block diagram illustrating configurations for allocating resources, according to some aspects of the disclosure.

In some aspects, the PDCCH 208 may include a Scell dormancy indication field and a configuration for scheduling data. FIG. 5 is a block diagram illustrating configurations for scheduling data, according to some aspects of the disclosure. In FIG. 5, example configurations for scheduling data may be a resource allocation type 0 configuration illustrated as an RBG bitmap 502 and a resource allocation type 1 configuration illustrated as an RB bitmap 504. In a type 0 configuration, the RBG bitmap 502 represents a bitmap for multiple resource block groups (RBGs) 506. Each RBG 506 may carry data. Further, RBG bitmap 502 may set bit=1 for RBGs 506 that are configured to carry data and bit=0 for RBGs 506 that are not configured to carry data. In a type 1 configuration, the RB bitmap 504 represents bits associated with multiple resource blocks (RBs) 508. Consecutive RBs 508 may be configured to carry data. Each bit in RB bitmap 504 corresponds to an RB 508, and RBs 508 that may carry data may be designated using a starting RB 510 and an RB length 512. Accordingly, by setting the starting RB 510 at a selected RB 508 and counting the RB length 512 of RBs 508 from the selected RB 508, RB bitmap 504 may indicate RBs 508 that may carry data.

In some aspects, the PDCCH 208 may schedule data in the type 0 and type 1 resource allocation by including RBG bitmap 502 and/or RB bitmap 504. Because UE 115 in a dormancy-like state does not schedule data, but PDCCH 208 may include both the Scell dormancy indication field and data scheduling bitmaps, UE 115 may be configured to differentiate whether the PDCCH 208 includes a Scell dormancy indication field or is configured to schedule data.

In some aspects, the PDCCH 208 may include a Scell dormancy indication field and a FDRA field. A Scell dormancy indication field and the FDRA field may be included in the DL DCI or UL DCI.

In some aspects, UE 115 may determine that the PDCCH 208 may use the Scell dormancy indication field and may not schedule data under the following conditions. Under a first condition, the PDCCH 208 may use the Scell dormancy indication field when the FDRA field has all bits set to 0 and the resource allocation is type 0.

Under a second condition, the PDCCH 208 may use the Scell dormancy indication field when:

- the FDRA with the most significant bit (MSB) is set to 0 and the other bits in the FDRA are set 0, and
- the PDCCH 208 includes the resource allocation configurations that are type 0 and type 1.

Under a third condition, the PDCCH 208 may use the Scell dormancy indication field when the FDRA field has all bits set to 1 and the resource allocation configuration is type 1.

Under a fourth condition, the PDCCH 208 may use the Scell dormancy indication field when:

- the FDRA with a most significant bit (MSB) set to 1, the other bits in FDRA set 1, and
- the PDCCH 208 includes the resource allocation configurations that are type 0 and type 1.

In yet another aspect, to indicate that the PDCCH 208 includes the Scell dormancy indication field, the DL DCI or UL DCI may include a sounding reference signal (SRS) request field. When UE 115 receives the PDCCH 208, UE 115 may transmit a SRS in response to the SRS request field. Because UE 115 transmits a response to the PDCCH 208, UE 115 may use the SRS transmission as an acknowledgement that UE 115 received the PDCCH 208 that contains the Scell dormancy indication field. Further, because the UE 115 transmits an acknowledgment, the UE 115 may transmit the SRS instead of the HARQ-ACK. UE 115 may store the SRS request field from the DCI to determine whether the DCI includes the Scell dormancy indication field and whether the UE 115 may use the SRS to acknowledge the PDCCH 208.

In yet another aspect, to indicate that the PDCCH 208 includes the Scell dormancy indication field, the UL DCI may include a channel state information (CSI) request field. When UE 115 receives the PDCCH 208 with the UL DCI, the UE 115 may transmit a CSI in response to the CSI request field. Because UE 115 transmits a response to the PDCCH 208, UE 115 may use the CSI transmission as an acknowledgement that UE 115 received the PDCCH 208 that contains the Scell dormancy indication field. Further, because the UE 115 transmits an acknowledgment, the UE 115 may transmit the CSI instead of a HARQ-ACK. UE 115 may store the CSI request field from the UL DCI to determine whether UE 115 may use the CSI to acknowledge PDCCH 208.

In some aspects, PDCCH 208 may include a dormancy indication for a serving cell using a combination of one or more fields. For example, a DL DCI or a UL DCI for the PDCCH 208 may include a modulation and coding scheme field, a new data indicator field, a redundancy version field, a HARQ process number field, an antenna port(s) field, or a DMRS sequence initialization field. A combination of one or more of the above fields may be used to indicate a dormancy indication in the PDCCH 208.

In some aspects of the disclosure, the UE 115 may receive PDCCH 208 that includes a DL DCI with a transmission power command (TPC) field. The TPC field may control transmission power for a scheduled PUCCH. For example, UE 115 may use the TPC field to adjust the transmission power and transmit the PUCCH using the adjusted transmission power. In some instances, when the DL DCI includes the Scell dormancy indication field that indicates that the UE 115 may enter a dormancy-like state, the UE 115 may be adjusted to transmit the PUCCH using less power as indicated in the TPC field. Similarly, when the DL DCI includes the Scell dormancy indication field that indicates that the UE 115 may enter a non-dormancy like state, the UE 115 may transmit the PUCCH using more power as indicated in the TPC field.

In some aspects of the disclosure, UE 115 may experience an application delay associated with a dormancy indication. The application delay may be the time for the dormancy indication to take effect after UE 115 receives the PDCCH 208. In some aspects, the time for application delay may be the same regardless of whether PDCCH 208 also schedules data. The application delay may be configured within UE 115 and may apply in instances when UE 115 receives PDCCH 208 during the active time portion 210 or when the DRX cycle 202 is not configured in network 100. The application delay may also be set as the amount of time that UE 115 may have to switch between the dormancy-like BWP and regular BWP.

Figure 6:
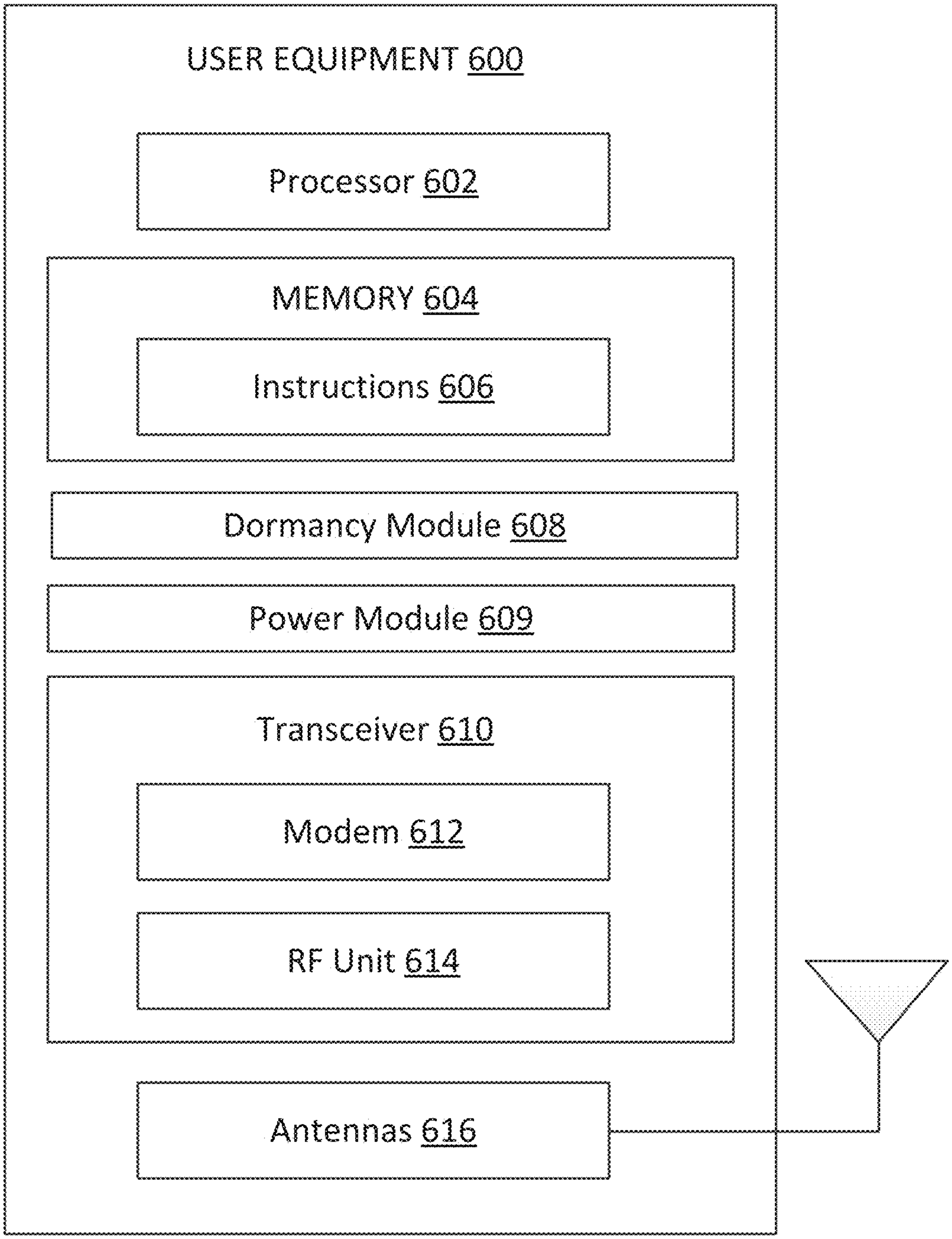
FIG. 6 is a block diagram of an exemplary user equipment (UE) according to some aspects of the present disclosure.

FIG. 6 is a block diagram of an exemplary UE 600 according to some aspects of the present disclosure. The UE 600 may be a UE 115 discussed above in FIG. 1. As shown, the UE 600 may include a processor 602, a memory 604, a dormancy module 608, a power module 609, a transceiver 610 including a modem subsystem 612 and a radio frequency (RF) unit 614, and one or more antennas 616. These elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs 115 in connection with aspects of the present disclosure, for example, aspects of FIGS. 2-5 and 8-10. Instructions 606 may also be referred to as program code. The program code may be for causing a wireless communication device to perform these operations, for example by causing one or more processors (such as processor 602) to control or command the wireless communication device to do so. The terms “instructions” and “code” should be interpreted broadly to include any type of computer-readable statement(s). For example, the terms “instructions” and “code” may refer to one or more programs, routines, sub-routines, functions, procedures, etc. “Instructions” and “code” may include a single computer-readable statement or many computer-readable statements.

The dormancy module 608 may be implemented via hardware, software, or combinations thereof. For example, the dormancy module 608 may be implemented as a processor, circuit, and/or instructions 606 stored in the memory 604 and executed by the processor 602. In some instances, the dormancy module 608 can be integrated within the modem subsystem 612. For example, the dormancy module 608 can be implemented by a combination of software components (e.g., executed by a DSP or a general processor) and hardware components (e.g., logic gates and circuitry) within the modem subsystem 612.

The dormancy module 608 may be used for various aspects of the present disclosure, for example, aspects of FIGS. 2-5 and 8-10. The dormancy module 608 may detect whether a PDCCH 208 includes a dormancy indication field, such as a serving cell dormancy indication field. Dormancy module 608 may then cause transceiver 610 to transmit a HARQ-ACK in response to detecting the secondary cell dormancy indication field. In some aspects, dormancy module 608 may identify the serving cell dormancy indication field or other fields that may include the secondary cell dormancy indication in the DCI of the PDCCH 208. Dormancy module 608 may also generate a HARQ-ACK, such as a single bit HARQ-ACK, a semi-static codebook or a dynamic codebook that includes the HARQ-ACK and a location of the HARQ-ACK in the semi-static codebook or dynamic codebook. Dormancy module 608 may also determine a slot and resources for transmitting the HARQ-ACK from UE 600, 115 to BS 105 in the PUCCH. In some aspects, dormancy module 608 may also determine when the PDCCH 208 is associated with the dormancy indication and is not configured to schedule data for uplink or downlink transmission. Dormancy module 608 may also determine a time period that UE 115 has to change from a dormancy-like state to a non-dormancy-like state or vice versa.

The power module 609 may be implemented via hardware, software, or combinations thereof. For example, the power module 609 may be implemented as a processor, circuit, and/or instructions 606 stored in the memory 604 and executed by the processor 602. In some instances, the power module 609 can be integrated within the modem subsystem 612. For example, the power module 609 can be implemented by a combination of software components (e.g., executed by a DSP or a general processor) and hardware components (e.g., logic gates and circuitry) within the modem subsystem 612.

The power module 609 may be used for various aspects of the present disclosure, for example, aspects of FIGS. 2-5 and 8-10. The power module may adjust transmission power of UE 115, 600, and transmit the PUCCH using the adjusted transmission power.

As shown, the transceiver 610 may include the modem subsystem 612 and the RF unit 614. The transceiver 610 can be configured to communicate bi-directionally with other devices, such as the BSs 105. The modem subsystem 612 may be configured to modulate and/or encode the data from the memory 604 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PUSCH data) from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 115, 600 to enable the UE 115, 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The antennas 616 may include multiple antennas of similar or different designs in order to sustain multiple transmission links. The RF unit 614 may configure the antennas 616.

In an aspect, the UE 600 can include multiple transceivers 610 implementing different RATs (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
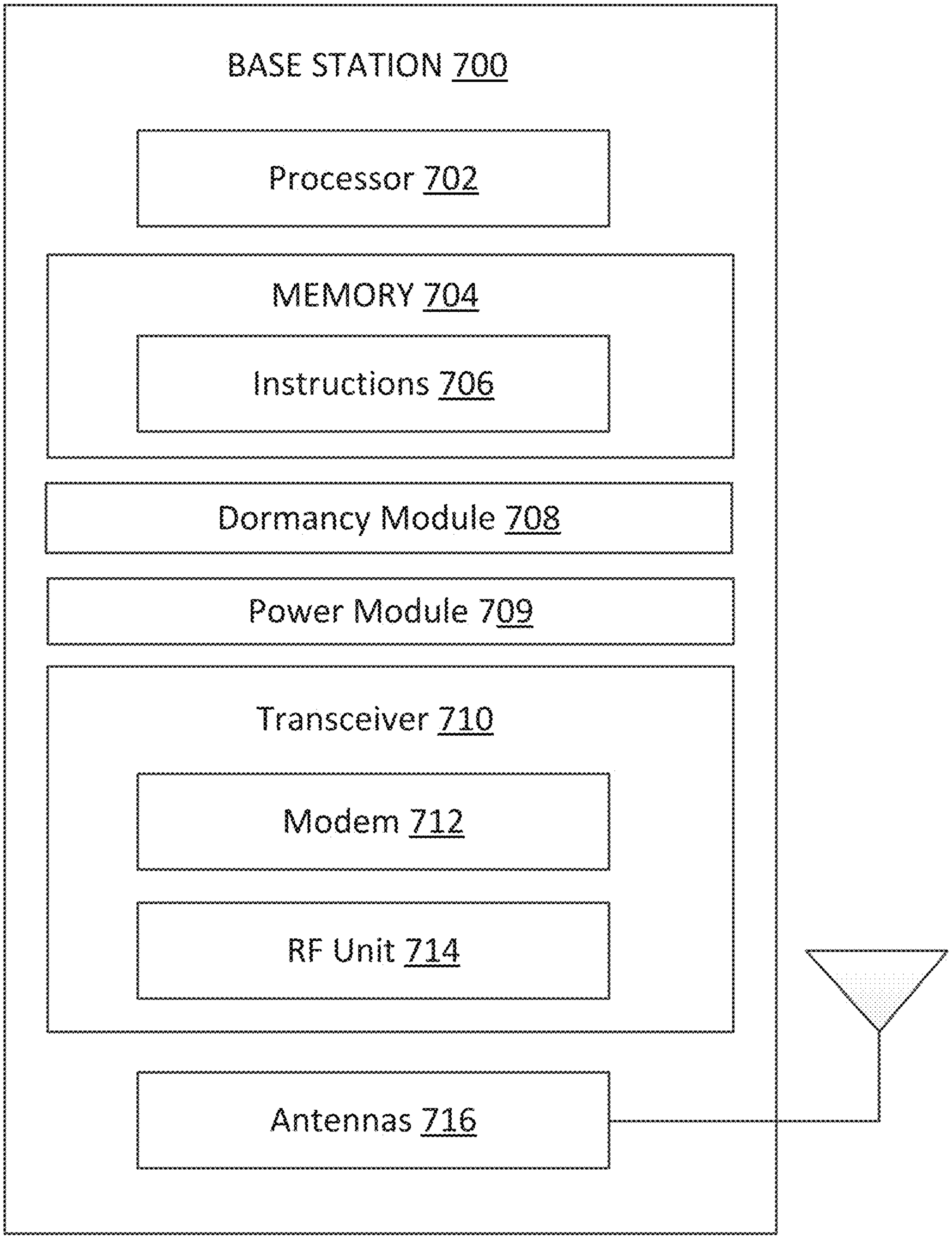
FIG. 7 is a block diagram of an exemplary base station (BS) according to some aspects of the present disclosure.

FIG. 7 is a block diagram of an exemplary BS 700 according to some aspects of the present disclosure. The BS 700 may be a BS 105 in the network 100 as discussed above in FIG. 1. A shown, the BS 700 may include a processor 702, a memory 704, a dormancy module 708, a power module 709, a transceiver 710 including a modem subsystem 712 and a RF unit 714, and one or more antennas 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 2-5 and 8-10. Instructions 706 may also be referred to as code, which may be interpreted broadly to include any type of computer-readable statement (s) as discussed above with respect to FIG. 6.

The dormancy module 708 may be used for various aspects of the present disclosure, for example, aspects of FIGS. 2-5 and 8-10. The dormancy module 708 may configure the PDCCH 208 to include a dormancy indication field, such as a secondary cell dormancy indication field. Dormancy module 708 may also determine a slot and resources that may carry the HARQ-ACK to BS 700, 105, an include the fields the specify the slot and the resources into the PDCCH 208 or the DL or UL DCI included in the PDCCH 208. In some aspects, dormancy module 708 may schedule data allocation and a serving cell dormancy indication fields in the PDCCH 208 such that UE 115 may determine whether the PDCCH 208 may be used to indicate dormancy of the serving cell(s) or schedule data. In some aspects, dormancy module 908 may also configure the PDCCH 208 to cause UE 115 to change from a dormancy-like state to a non-dormancy like state or vice versa.

The power module 709 may be implemented via hardware, software, or combinations thereof. For example, the power module 709 may be implemented as a processor, circuit, and/or instructions 706 stored in the memory 704 and executed by the processor 702. In some instances, the power module 709 can be integrated within the modem subsystem 712. For example, the power module 709 can be implemented by a combination of software components (e.g., executed by a DSP or a general processor) and hardware components (e.g., logic gates and circuitry) within the modem subsystem 712.

The power module 709 may be used for various aspects of the present disclosure, for example, aspects of FIGS. 2-5 and 8-10. The power module 709 may configure the PDCCH 208 with fields that cause the UEs 115, 600 to adjust transmission power for the PUCCH transmissions.

As shown, the transceiver 710 may include the modem subsystem 712 and the RF unit 714. The transceiver 710 can be configured to communicate bi-directionally with other devices, such as the UEs 115 and/or 600 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 and/or UE 600. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 105 to enable the BS 105 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, transmission of information to complete attachment to a network and communication with a camped UE 115 or 600 according to some aspects of the present disclosure. The antennas 716 may further receive data messages transmitted from other devices and provide the received data messages for processing and/or demodulation at the transceiver 710. The antennas 716 may include multiple antennas of similar or different designs in order to sustain multiple transmission links.

In an aspect, the BS 700 can include multiple transceivers 710 implementing different RATs (e.g., NR and LTE). In an aspect, the BS 700 can include a single transceiver 710 implementing multiple RATs (e.g., NR and LTE). In an aspect, the transceiver 710 can include various components, where different combinations of components can implement different RATs.

Figure 8:
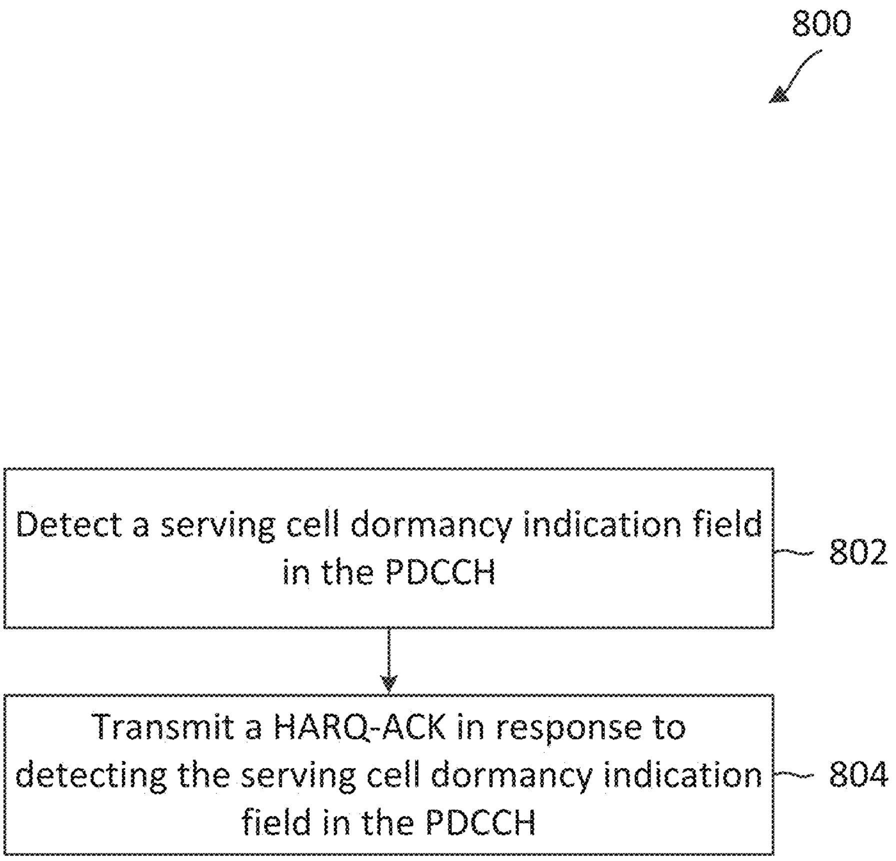
FIG. 8 is a flow diagram of a method for communicating a serving cell dormancy indication field, according to some aspects of the present disclosure.

FIG. 8 is a flow diagram of a communication method 800 for detecting a serving cell dormancy field in the PDCCH, according to some aspects of the present disclosure. Steps of the method 800 can be executed by a computing device (e.g., a processor, processing circuit, and/or other suitable component) of a wireless communication device or other suitable means for performing the steps. For example, a wireless communication device, such as the UE 115 or 600, may utilize one or more components, such as the processor 602, the memory 604, the dormancy module 608, the transceiver 610, the modem subsystem 612, and the one or more antennas 616, to execute the steps of method 800. As illustrated, the method 800 includes a number of enumerated steps, but aspects of the method 800 may include additional steps before, after, and in between the enumerated steps. In some aspects, one or more of the enumerated steps may be omitted or performed in a different order.

At step 802, the method 800 includes detecting, at UE 115 or 600 the PDCCH 208 or PDCCH WUS 214 with a Scell dormancy indication field. As discussed above, the Scell dormancy indication field may be included in the DCI. As discussed above, the Scell dormancy indication field may apply to an individual Scell or to multiple Scells and indicates dormancy-like or non-dormancy like state for an individual Scell or multiple Scells. The domancy-like state may correspond to dormant BWP and non-dormancy like state may correspond to regular BWP.

At step 804, the method 800 includes transmitting a HARQ-ACK in response to detecting the PDCCH 208 with the Scell dormancy indication field to BS 105. The HARQ-ACK may indicate to BS 105 which Scells associated with UE 115 are in the dormancy-like or non-dormancy like state. This causes BS 105 and UE 115 to have the same understanding regarding the dormancy-like and non-dormancy like states of the Scells associated with UE 115. In some aspects, the HARQ-ACK may include a one bit ACK that indicates that the UE detected the PDCCH. The HARQ-ACK may also include a semi-static or dynamic codebook that includes the one-bit.

Figure 9:
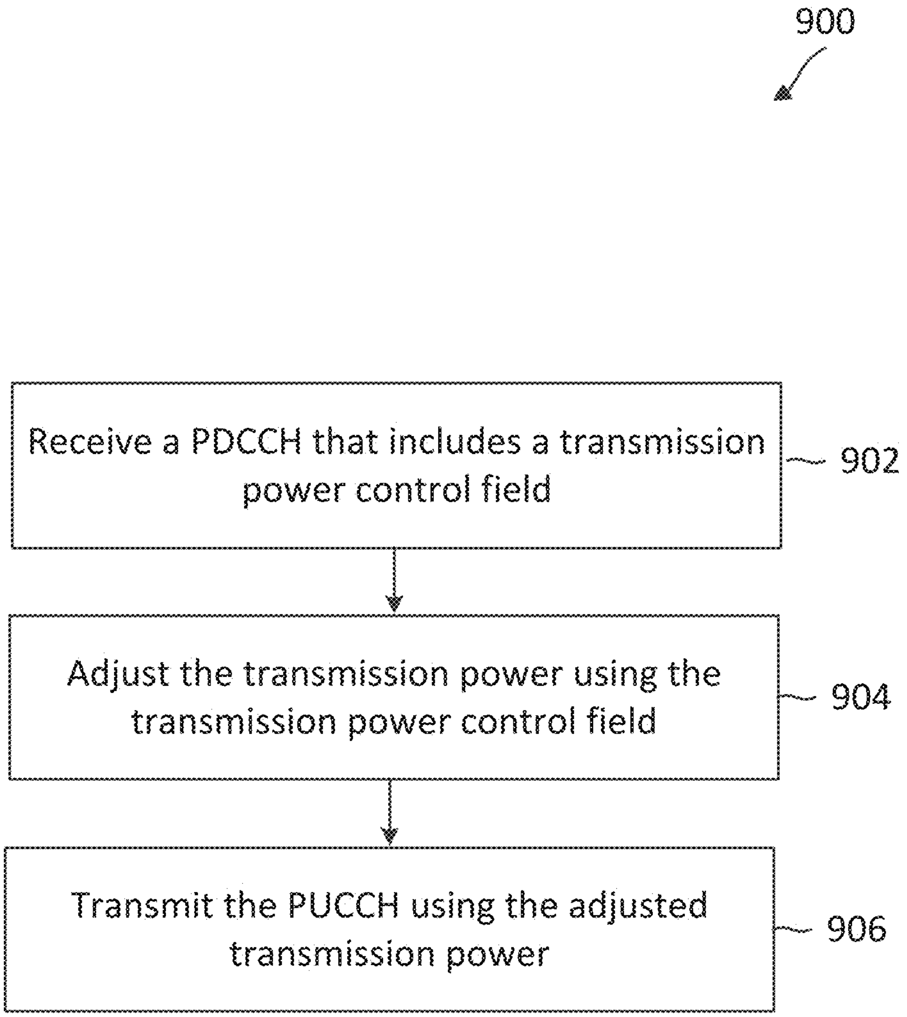
FIG. 9 is a flow diagram of a method for adjusting transmission power on a user equipment, according to some aspects of the present disclosure.

FIG. 9 is a flow diagram of a communication method 900 for adjusting power of a UE, according to some aspects of the present disclosure. Steps of the method 900 can be executed by a computing device (e.g., a processor, processing circuit, and/or other suitable component) of a wireless communication device or other suitable means for performing the steps. For example, a wireless communication device, such as the UE 115 or 600, may utilize one or more components, such as the processor 602, the memory 604, the dormancy module 608, the transceiver 610, the modem subsystem 612, and the one or more antennas 616, to execute the steps of method 900. As illustrated, the method 900 includes a number of enumerated steps, but aspects of the method 900 may include additional steps before, after, and in between the enumerated steps. In some aspects, one or more of the enumerated steps may be omitted or performed in a different order.

At step 902, the method 900 includes receiving, at UE 115 or 600, PDCCH 208 with a TPC field. The TPC field may control transmission power for a scheduled PUCCH. As discussed above, the TPC field may be included in the DCI and may be used to adjust the transmission power that UE 115 or 600 uses to transmit the PUCCH.

At step 904, the method 900 includes adjusting, using the TPC field, the transmission power of the UE 115 or 600 to transmit the PUCCH. For example, if the TPC field indicates for the transmission power to be adjusted to a lower power, the UE 115 may enter a dormancy-like state that uses less power. On the other hand, if the TPC field indicates for the transmission power to be adjusted to a higher power, the UE 115 may enter a non-dormancy like state that uses more power.

At step 906, the method 900 includes transmitting the PUCCH using the transmission power adjusted in step 904. For example, once the power is adjusted in step 904, the UE 115 may transmit the PUCCH using the higher power which indicates that the UE 115 is in a non-dormancy like state or using lower power which indicates that the UE 115 is in a dormancy-like state.

Figure 10:
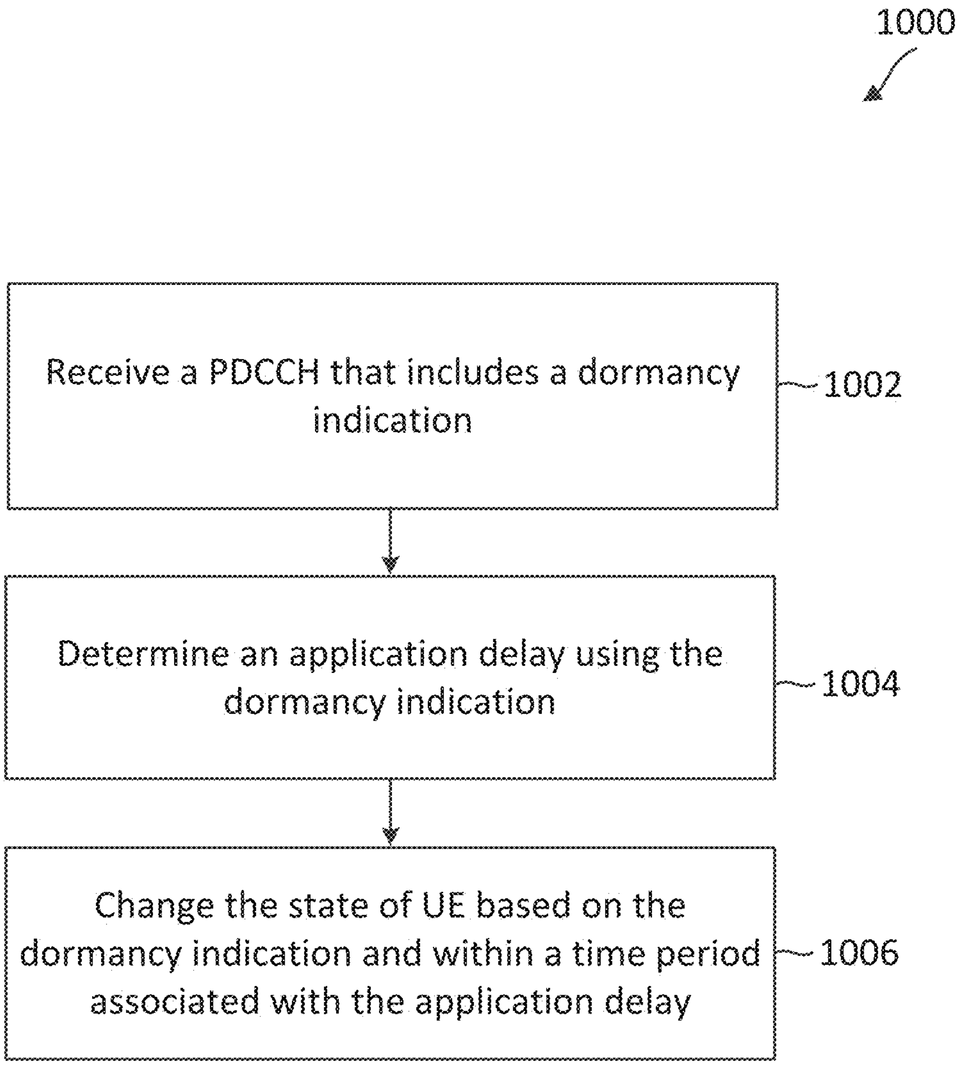
FIG. 10 is a flow diagram of a method for changing a dormancy state of a user equipment, according to some aspects of the present disclosure.

FIG. 10 is a flow diagram of a communication method 1000 for changing a dormancy state of a user equipment, according to some aspects of the present disclosure. Steps of the method 1000 can be executed by a computing device (e.g., a processor, processing circuit, and/or other suitable component) of a wireless communication device or other suitable means for performing the steps. For example, a wireless communication device, such as the UE 115 or 600, may utilize one or more components, such as the processor 602, the memory 604, the dormancy module 608, the transceiver 610, the modem subsystem 612, and the one or more antennas 616, to execute the steps of method 1000. As illustrated, the method 1000 includes a number of enumerated steps, but aspects of the method 1000 may include additional steps before, after, and in between the enumerated steps. In some aspects, one or more of the enumerated steps may be omitted or performed in a different order.

At step 1002, the method 1000 includes receiving, at UE 115 or 600, the PDCCH 208 with a dormancy indication for a secondary cell communication. The dormancy indication may be a field that indicates dormancy-like or non-dormancy like state for the secondary communication cell. The dormancy indication may be included in the DCI.

At step 1004, the method 1000 includes determining an application delay associated with the dormancy indication. The application delay may be the time period during which the secondary communication cell switches from a dormant-like to non-dormant like state or vice versa. The application delay may apply to instances when UE 115 receives PDCCH 208 during the active time portion 210 or when the DRX cycle 202 is not configured in network 100. The application delay may also be the amount of time that UE 115 may have to switch between the dormancy-like BWP and regular BWP.

At step 1006, the method 1000 includes changing UE 115 or 600 from a dormancy-like state to non-dormancy like state, or vice versa, based on the dormancy indication and within a time period associated with the application delay.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A user equipment (UE) comprising:

a processor configured to:

detect a physical downlink control channel (PDCCH) with a secondary cell (Scell) dormancy indicator, wherein the Scell dormancy indicator is configured to switch the UE between a dormancy state and a non-dormancy state, wherein in the dormancy state the UE is configured to operate at a reduced power as compared to the non-dormancy state;

generate a codebook with a hybrid-ARQ acknowledgment (HARQ-ACK) indicating that the UE detected the PDCCH with the Scell dormancy indicator, wherein the HARQ-ACK is at a location in the codebook indicated in a downlink assignment index (DAI) field; and a transceiver configured to transmit the codebook with the HARQ-ACK in response to the processor detecting the PDCCH.

2. The UE of claim 1, wherein the PDCCH further comprises a downlink control information (DCI) that includes the Scell dormancy indicator.

3. The UE of claim 1, wherein the HARQ-ACK is a one-bit ACK that indicates that the UE detected the PDCCH.

4. The UE of claim 1, wherein the codebook is a dynamic codebook.

5. The UE of claim 1, wherein the PDCCH further comprises a DCI that includes the Scell dormancy indicator and a feedback timing information; and the processor is further configured to:

determine a number of slots using the feedback timing information in the DCI; and delay the transmitting of the HARQ-ACK by the number of slots relative to a slot where the PDCCH is detected.

6. The UE of claim 5, wherein the DCI is a downlink scheduling (DL) DCI and the feedback timing information is a PDSCH-to-HARQ feedback timing indicator.

7. The UE of claim 1, wherein the PDCCH further comprises a DL DCI that includes the Scell dormancy indicator and a physical uplink control channel (PUCCH) resource indicator; and wherein to transmit the HARQ-ACK the transceiver is further configured to transmit the HARQ-ACK in a resource indicated by the PUCCH resource indicator.

8. The UE of claim 1, wherein the PDCCH further comprises a DL DCI that includes the Scell dormancy indicator and the DAI field; and the processor is further configured to determine the location of the HARQ-ACK in the codebook using the DAI field.

9. The UE of claim 1, wherein the PDCCH further comprises a DCI that includes the Scell dormancy indicator; and the processor is further configured to determine, using a frequency domain resource assignment (FDRA) field in the DCI, that the PDCCH is associated with a Scell dormancy indicator and is not configured to schedule data.

10. The UE of claim 9, wherein to determine that the PDCCH is associated with the Scell dormancy indicator and is not configured to schedule the data, the processor is further configured to determine at least one of:

a resource allocation type zero is enabled and all bits in the FDRA are set to zero, the resource allocation type zero and a resource allocation type one are configured, the resource allocation type zero is enabled and some bits in the FDRA are set to zero and one bit in the FDRA is set to one, the resource allocation type one is enabled and the all bits in the FDRA are set to one, or the resource allocation type one is enabled and the some bits in the FDRA are set to one and the one bit in the FDRA is set to zero.

11. The UE of claim 1, wherein the Scell dormancy indicator includes at least one of a modulation and coding scheme field, a new data indicator, a redundancy version indicator, a HARQ process number indicator, an antenna port indicator, or a demodulation reference signal (DMRS) sequence initialization indicator in at least one DCI in the PDCCH; and wherein the processor is further configured to modify behavior of the UE using the at least one of the modulation and coding scheme field, the new data indicator, the redundancy version indicator, the HARQ process number indicator, the antenna port indicator, or the DMRS sequence initialization indicator.

12. The UE of claim 1, wherein the processor is further configured to:

determine an application delay associated the Scell dormancy indicator; and change a behavior of the UE based on the Scell dormancy indicator during a time period associated with the application delay.

13. The UE of claim 12, wherein the processor is further configured to:

determine that the application delay is the time period the UE switches from a dormant bandwidth part to a non-dormant bandwidth part.

14. The UE of claim 12, wherein the application delay is the same if the PDCCH schedules data or the PDCCH does not schedule the data.

15. A method, comprising:

detecting, at a user equipment (UE), a physical downlink control channel (PDCCH) with a secondary cell (Scell) dormancy indicator, wherein the Scell dormancy indicator is configured to switch the UE between a dormancy state and a non-dormancy state, wherein in the dormancy state the UE is configured to operate at a reduced power as compared to the non-dormancy state;

generating a codebook with a hybrid-ARQ acknowledgment (HARQ-ACK) indicating that the UE detected the PDCCH with the Scell dormancy indicator, wherein the HARQ-ACK is at a location in the codebook indicated in a downlink assignment index (DAI) field; and transmitting the codebook with the HARQ-ACK in response to detecting the PDCCH.

16. The method of claim 15, wherein the PDCCH further comprises a downlink control information (DCI) that includes the Scell dormancy indicator.

17. The method of claim 15, wherein the HARQ-ACK is a one-bit ACK that indicates that the UE detected the PDCCH.

18. The method of claim 15, wherein the codebook is a dynamic codebook.

19. A computer-readable medium having instructions stored thereon, that when executed by a processor cause the processor to perform operations, the operations comprising:

detecting, at a user equipment (UE), a physical downlink control channel (PDCCH) with a secondary cell (Scell) dormancy indicator, wherein the Scell dormancy indicator is configured to switch the UE between a dormancy state and a non-dormancy state, wherein in the dormancy state the UE is configured to operate at a reduced power as compared to the non-dormancy state; and generating a codebook with a hybrid-ARQ acknowledgment (HARQ-ACK) indicating that the UE detected the PDCCH with the Scell dormancy indicator, wherein the HARQ-ACK is at a location in the codebook indicated in a downlink assignment index (DAI) field; and transmitting the codebook with the HARQ-ACK in response to detecting the PDCCH.

20. The computer-readable medium of claim 19, wherein the PDCCH further comprises a DL DCI that includes the Scell dormancy indicator and the DAI field; and the processor is further configured to determine the location of the HARQ-ACK in the codebook using the DAI field.

* * * * *